US009934806B2

(12) United States Patent
Xiao et al.

(10) Patent No.: US 9,934,806 B2
(45) Date of Patent: Apr. 3, 2018

(54) APPARATUS FOR METHODS FOR ALIGNED SERVO-RELATED FEATURES

(71) Applicant: Seagate Technology LLC, Cupertino, CA (US)

(72) Inventors: Shuaigang Xiao, Fremont, CA (US); David S. Kuo, Palo Alto, CA (US); XiaoMin Yang, Livermore, CA (US); Kim Y. Lee, Fremont, CA (US); Yautzong Hsu, Fremont, CA (US); Koichi Wago, Sunnyvale, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/403,040

(22) Filed: Jan. 10, 2017

(65) Prior Publication Data
US 2017/0125049 A1 May 4, 2017

Related U.S. Application Data

(63) Continuation of application No. 14/824,995, filed as application No. PCT/US2015/026248 on Apr. 16, 2015, now Pat. No. 9,620,161, which is a continuation-in-part of application No. 14/255,280, filed on Apr. 17, 2014, now Pat. No. 8,941,938.

(51) Int. Cl.
*G11B 5/596* (2006.01)
*G11B 20/12* (2006.01)
(52) U.S. Cl.
CPC ...... *G11B 5/59638* (2013.01); *G11B 20/1217* (2013.01); *G11B 2020/1281* (2013.01)

(58) Field of Classification Search
None
See application file for complete search history.

(56) References Cited

U.S. PATENT DOCUMENTS

| 6,961,203 | B1* | 11/2005 | Baker | B82Y 10/00 360/75 |
| 8,300,340 | B2* | 10/2012 | Sakurai | B82Y 10/00 360/135 |
| 2011/0096436 | A1* | 4/2011 | Albrecht | G11B 5/855 360/135 |
| 2011/0170213 | A1* | 7/2011 | Ishioka | B82Y 10/00 360/48 |
| 2012/0217220 | A1* | 8/2012 | Dobisz | G03F 7/0002 216/41 |
| 2013/0126473 | A1* | 5/2013 | Dobisz | B82Y 30/00 216/49 |

(Continued)

OTHER PUBLICATIONS

PCT International Search Report and Written Opinion dated Oct. 22, 2015 in International Application No. PCT/US2015/026248. 7 pages.

(Continued)

*Primary Examiner* — Paul Huber

(57) ABSTRACT

Provided herein is a method, including creating a first pattern in a data region of a substrate, and creating a second pattern in a servo region of a substrate. A circumferential line pattern is created overlapping the first pattern to create rectangle-shaped protrusions in the data region of the substrate. A chevron pattern is created overlapping the second pattern to create chevron-derived protrusions in the servo region of the substrate.

20 Claims, 31 Drawing Sheets

(56) References Cited

U.S. PATENT DOCUMENTS

| | | | |
|---|---|---|---|
| 2013/0186856 A1* | 7/2013 | Xiao | B05D 3/107 216/47 |
| 2014/0030554 A1* | 1/2014 | Kikitsu | G11B 5/82 428/836 |
| 2015/0246476 A1* | 9/2015 | Steiner | G03F 7/0002 264/220 |

OTHER PUBLICATIONS

PCT International Preliminary Report on Patentability (Chapter I) dated Oct. 27, 2016 in International Application No. PCT/US2015/026248. 8 pages.

* cited by examiner

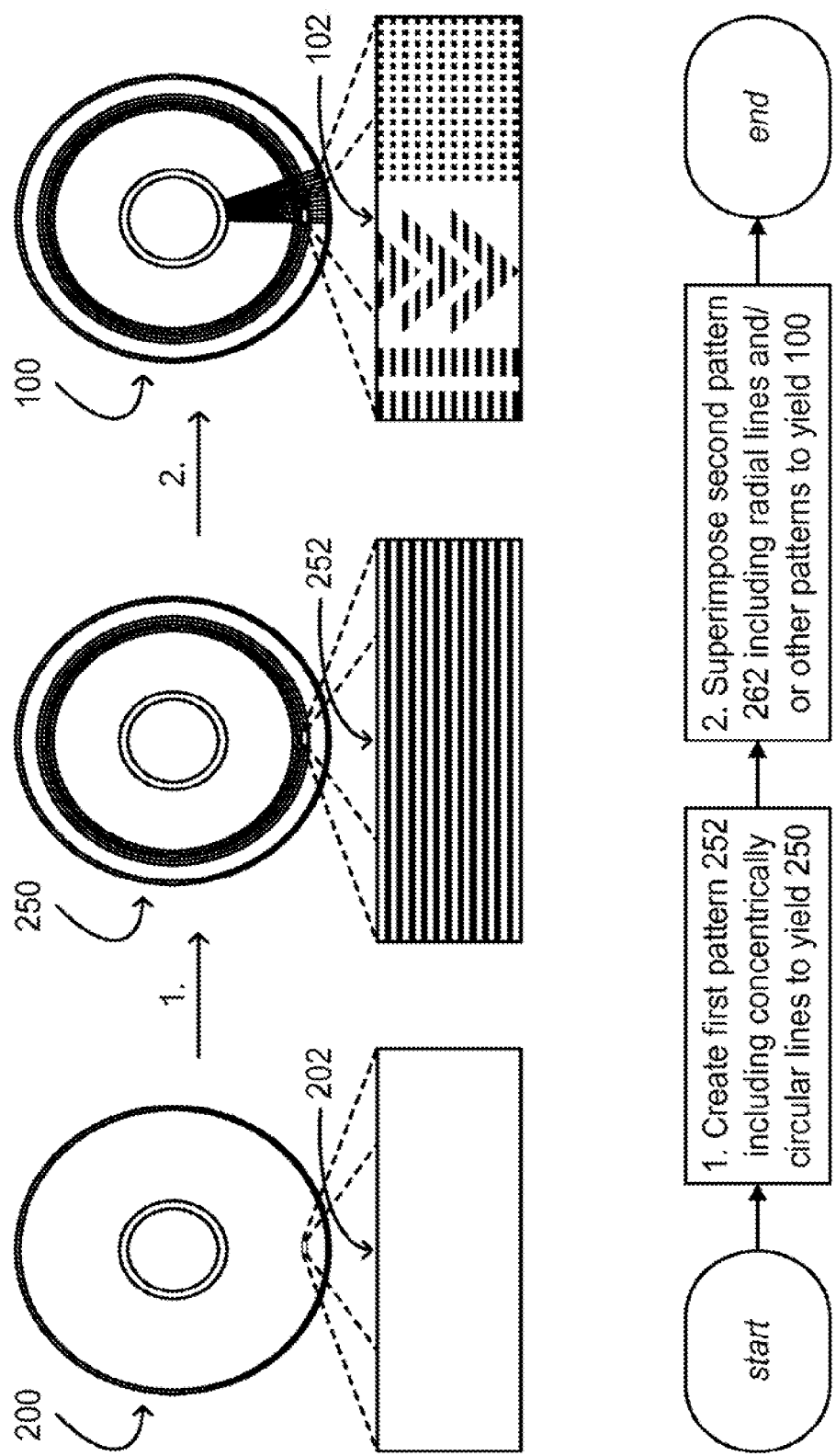

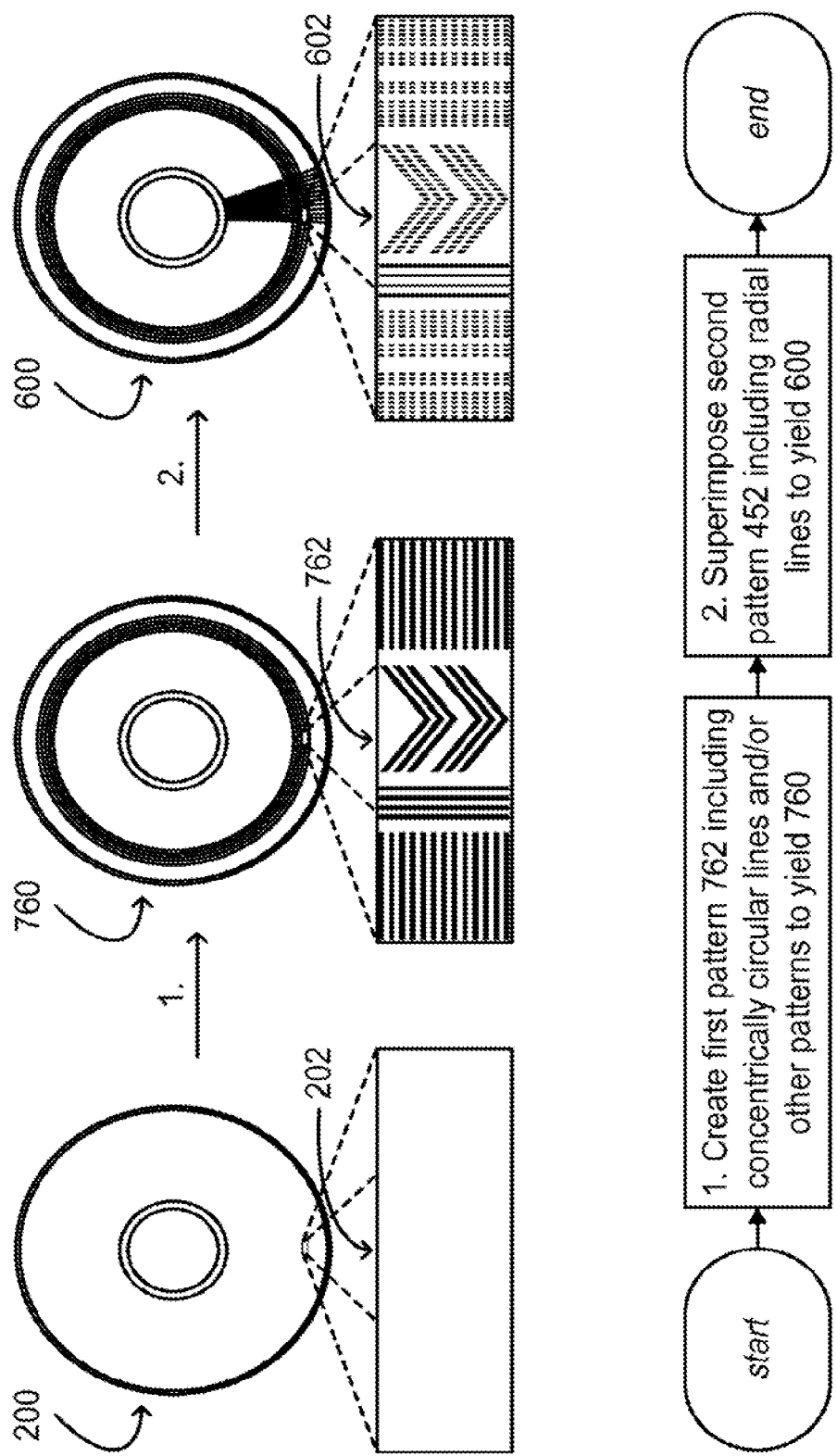

APPARATUS FOR METHODS FOR ALIGNED SERVO-RELATED FEATURES

CROSS-REFERENCE TO RELATED APPLICATION

This application is a continuation of prior U.S. patent application Ser. No. 14/824,995, filed Aug. 12, 2015, which is the U.S. National Stage of International Patent Application No. PCT/US2015/026248, filed Apr. 16, 2015, which is a continuation-in-part of U.S. patent application Ser. No. 14/255,280, filed Apr. 17, 2014, now U.S. Pat. No. 8,941,938.

BACKGROUND

Templates for patterned recording media such as so-called hexagonal bit-patterned media ("BPM") may be fabricated by directed self-assembly ("DSA") of block copolymers to hexagonally arrange sphere-forming block copolymers or cylinder-forming block copolymers. Due to certain requirements of the patterned recording media and/or respective recording devices, such hexagonally arranged block copolymers may need to be skewed from symmetric hexagonal arrangements. However, asymmetric arrangements are typically limited to a skew angle of about 8 degrees. To overcome the skew angle limit, templates for patterned recording media such as so-called rectangular BPM may be fabricated through cross imprinting. However, creation of complex servo patterns remains problematic across hexagonal and rectangular BPM. For example, it is difficult to create complex servo patterns about the natural line structures formed by lamella-forming block copolymer DSA.

SUMMARY

Provided herein is a method, including creating a first pattern in a data region of a substrate, and creating a second pattern in a servo region of a substrate. A circumferential line pattern is created overlapping the first pattern to create rectangle-shaped protrusions in the data region of the substrate. A chevron pattern is created overlapping the second pattern to create chevron-derived protrusions in the servo region of the substrate.

These and other features and/or aspects of the concepts provided herein may be better understood with reference to the following drawings, description, and appended claims.

DRAWINGS

Figure 1A:
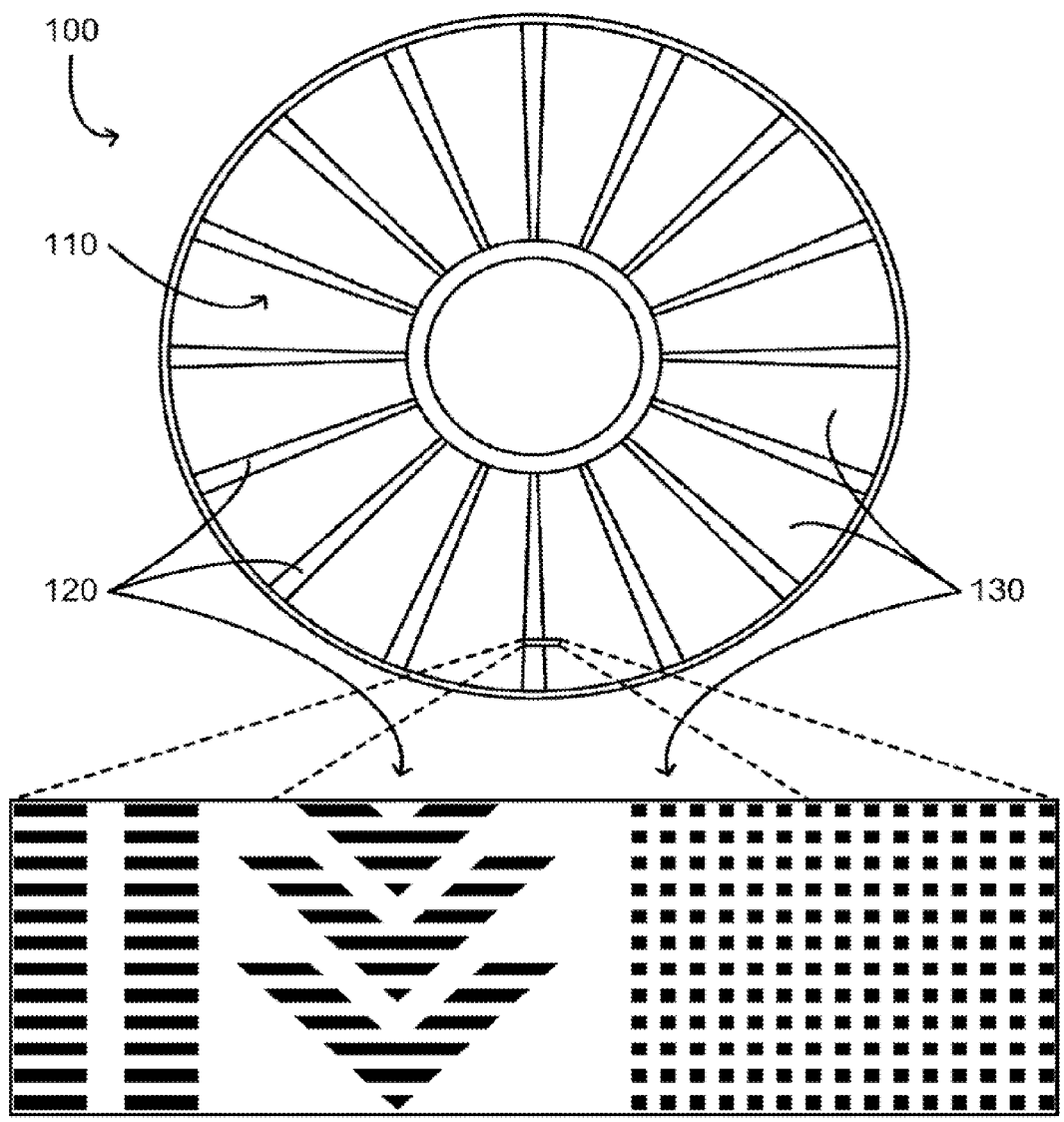

FIG. 1A provides a schematic illustrating a template for a patterned recording medium according to one or more embodiments.

Figure 1B:
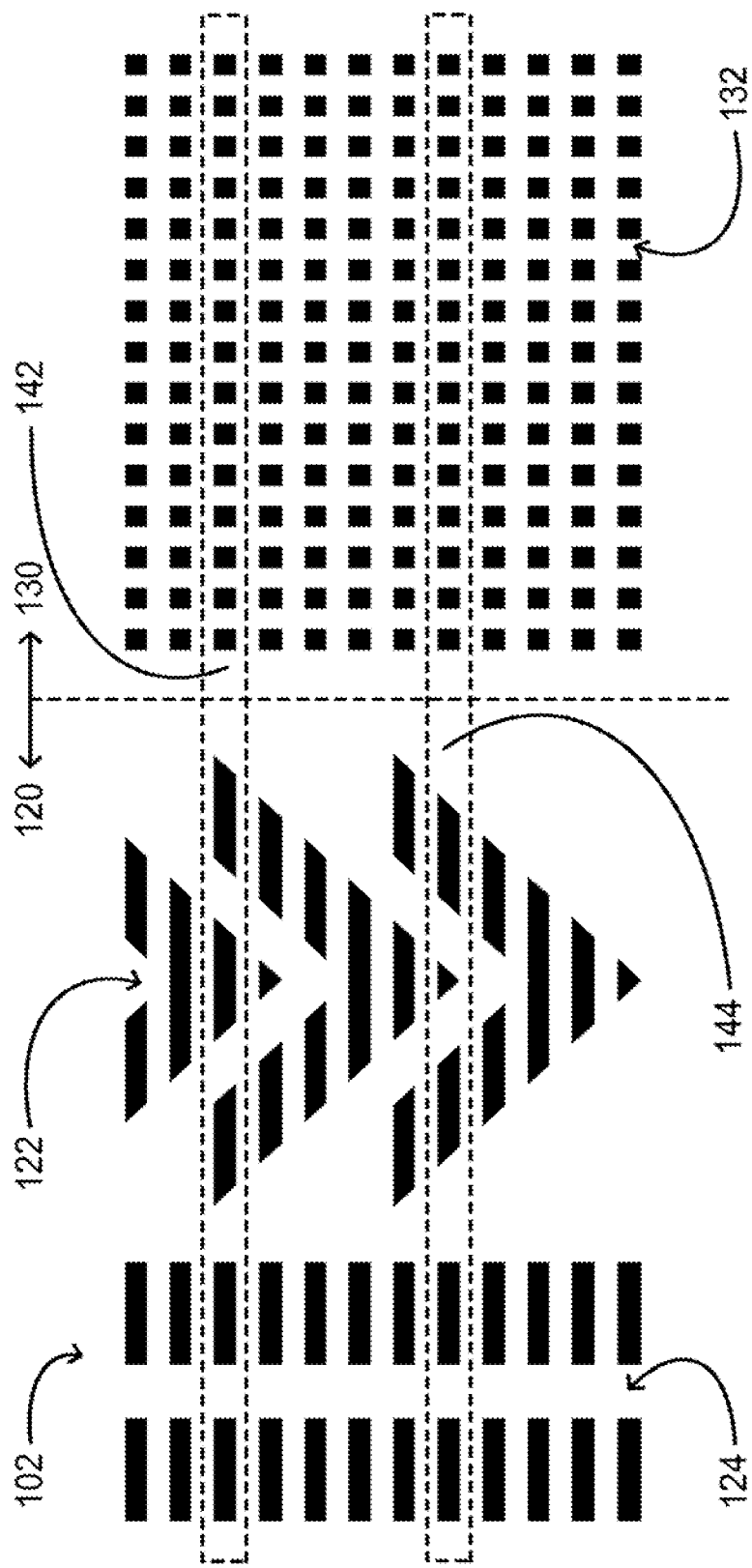

FIG. 1B provides a schematic illustrating a pattern of the template of FIG. 1A according to one or more embodiments.

FIG. 2A provides a schematic illustrating template fabrication according to one or more embodiments.

Figure 2B:
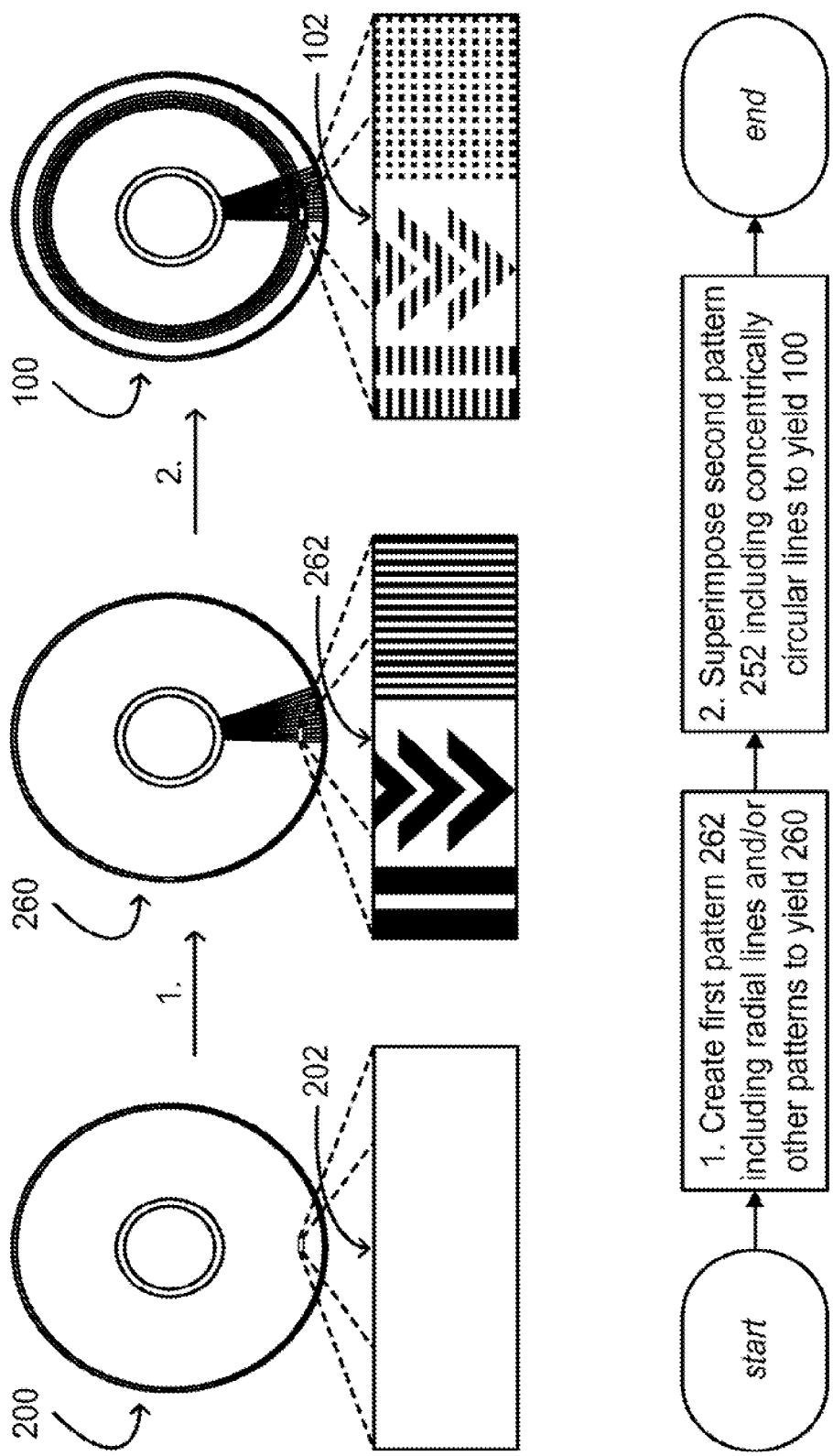

FIG. 2B provides a schematic illustrating template fabrication according to one or more embodiments.

Figure 2C:
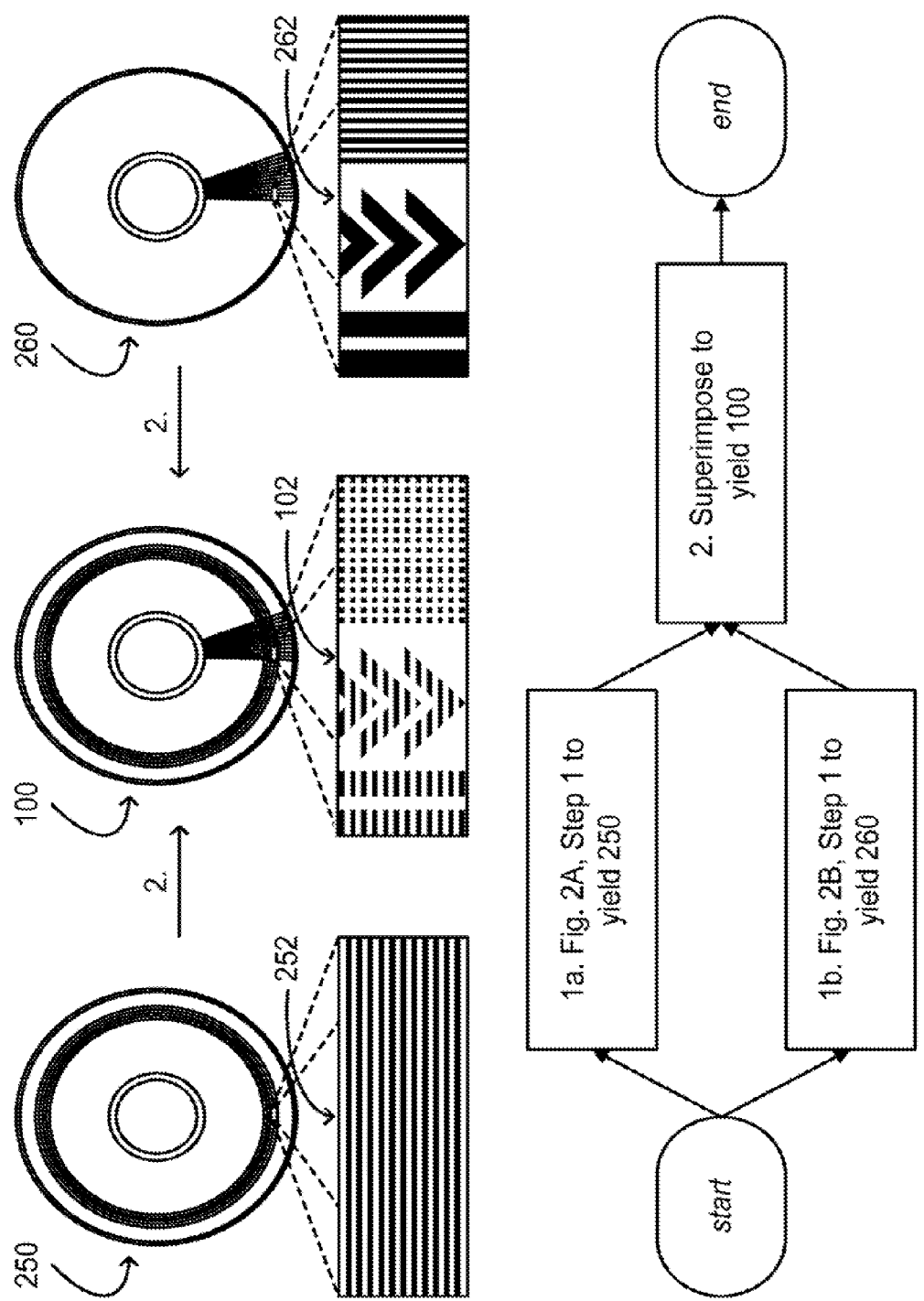

FIG. 2C provides a schematic illustrating template fabrication according to one or more embodiments.

Figure 3A:
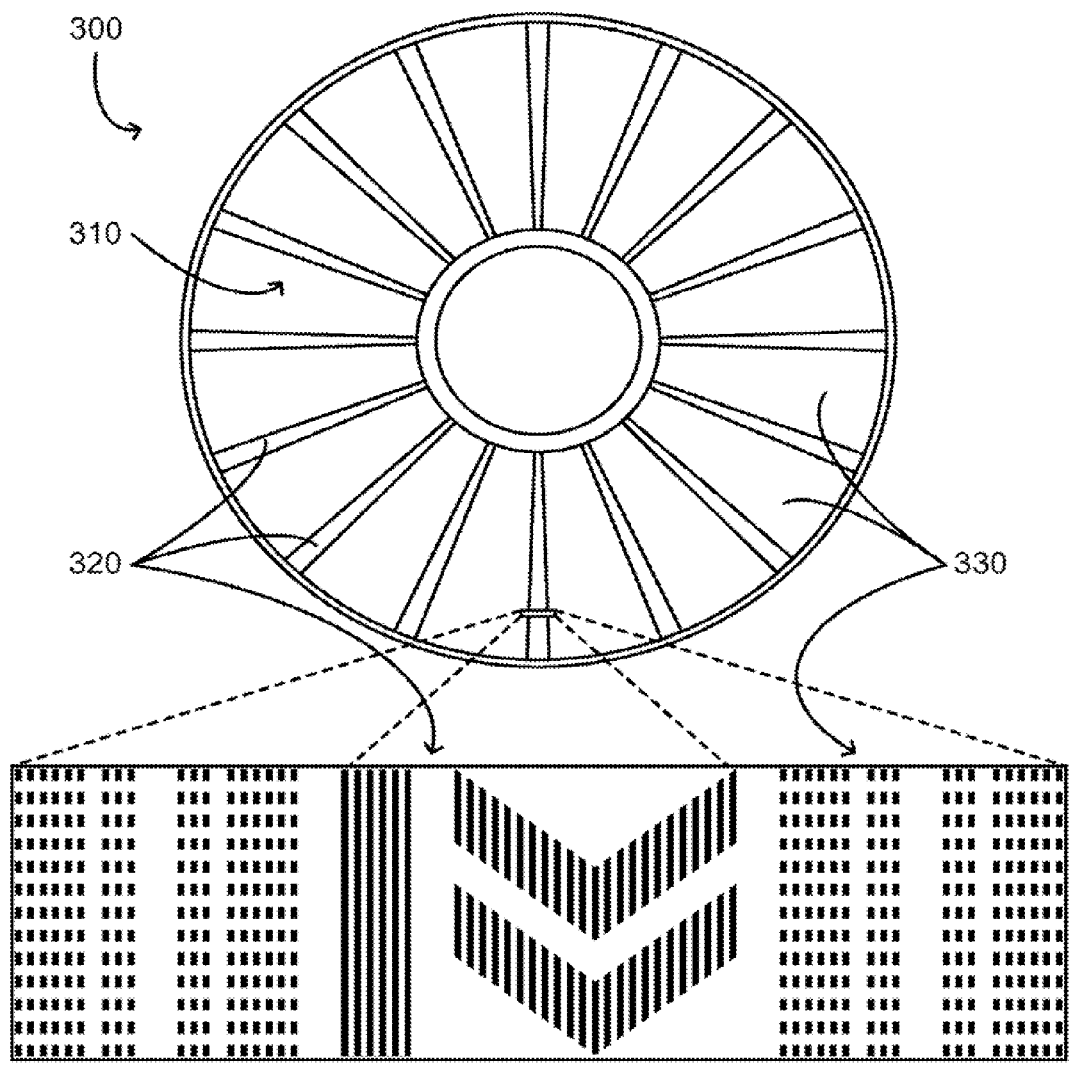

FIG. 3A provides a schematic illustrating a template for a patterned recording medium according to one or more embodiments.

Figure 3B:
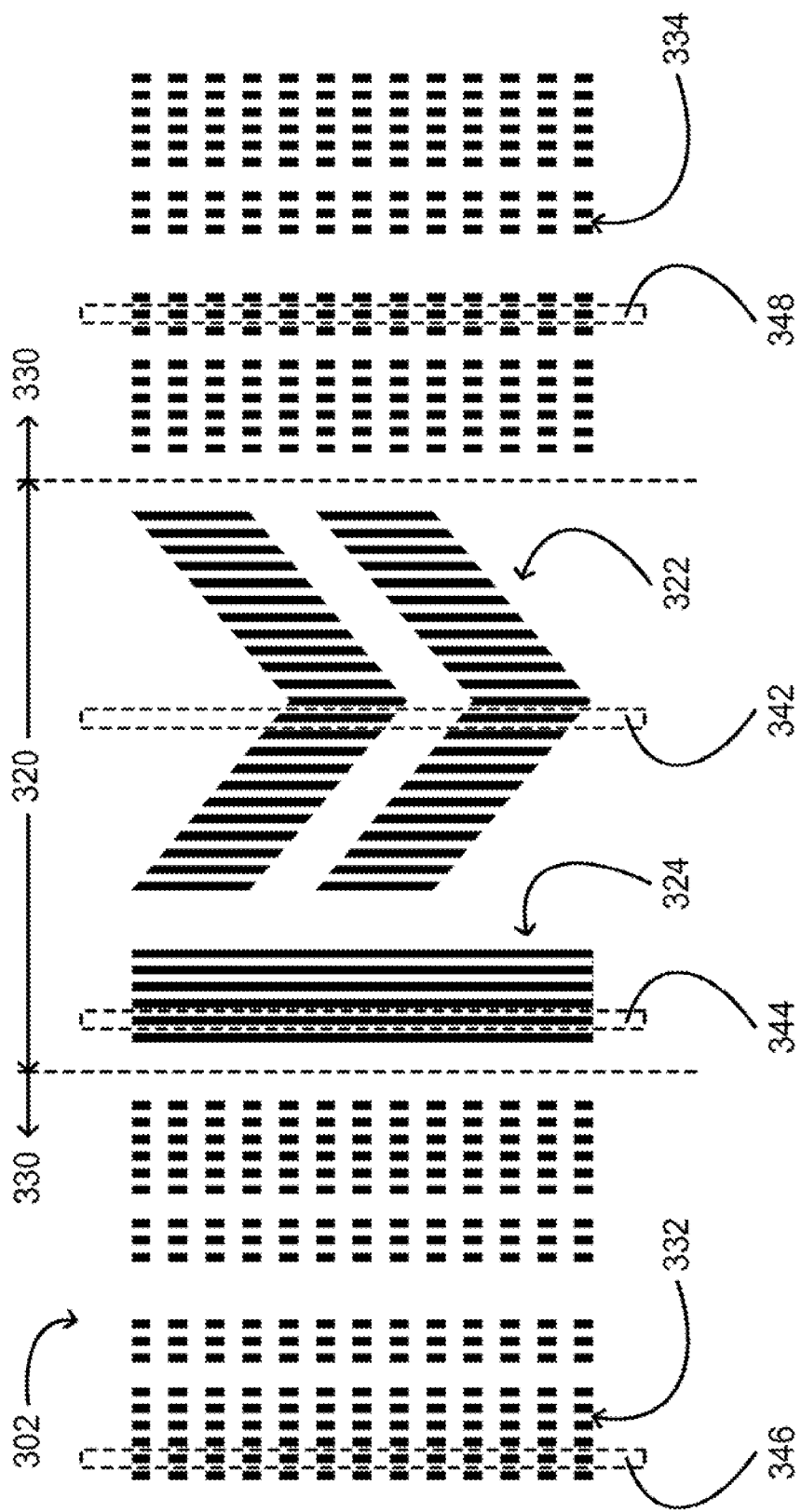

FIG. 3B provides a schematic illustrating a pattern of the template of FIG. 3A according to one or more embodiments.

Figure 4A:
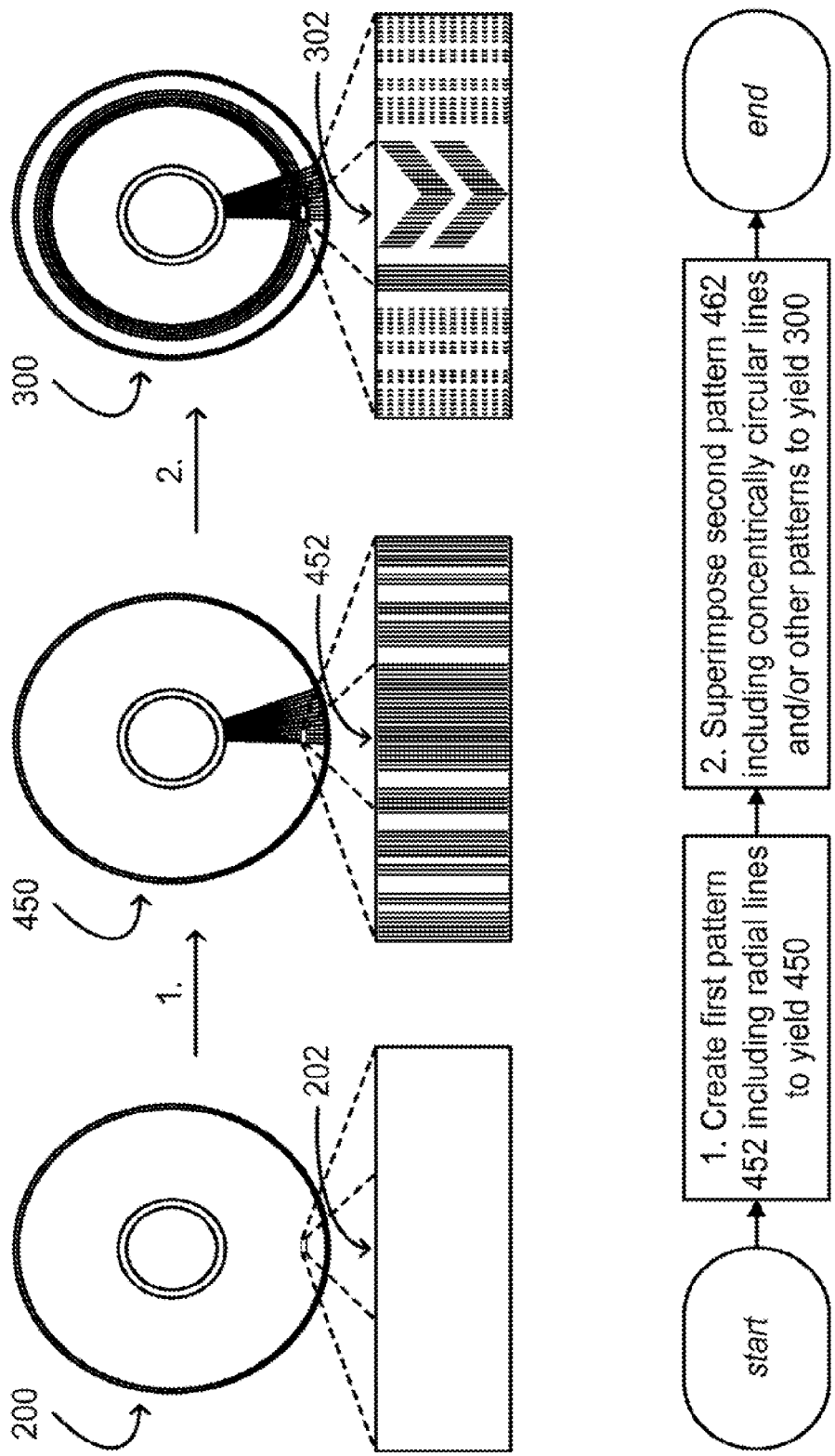

FIG. 4A provides a schematic illustrating template fabrication according to one or more embodiments.

Figure 4B:
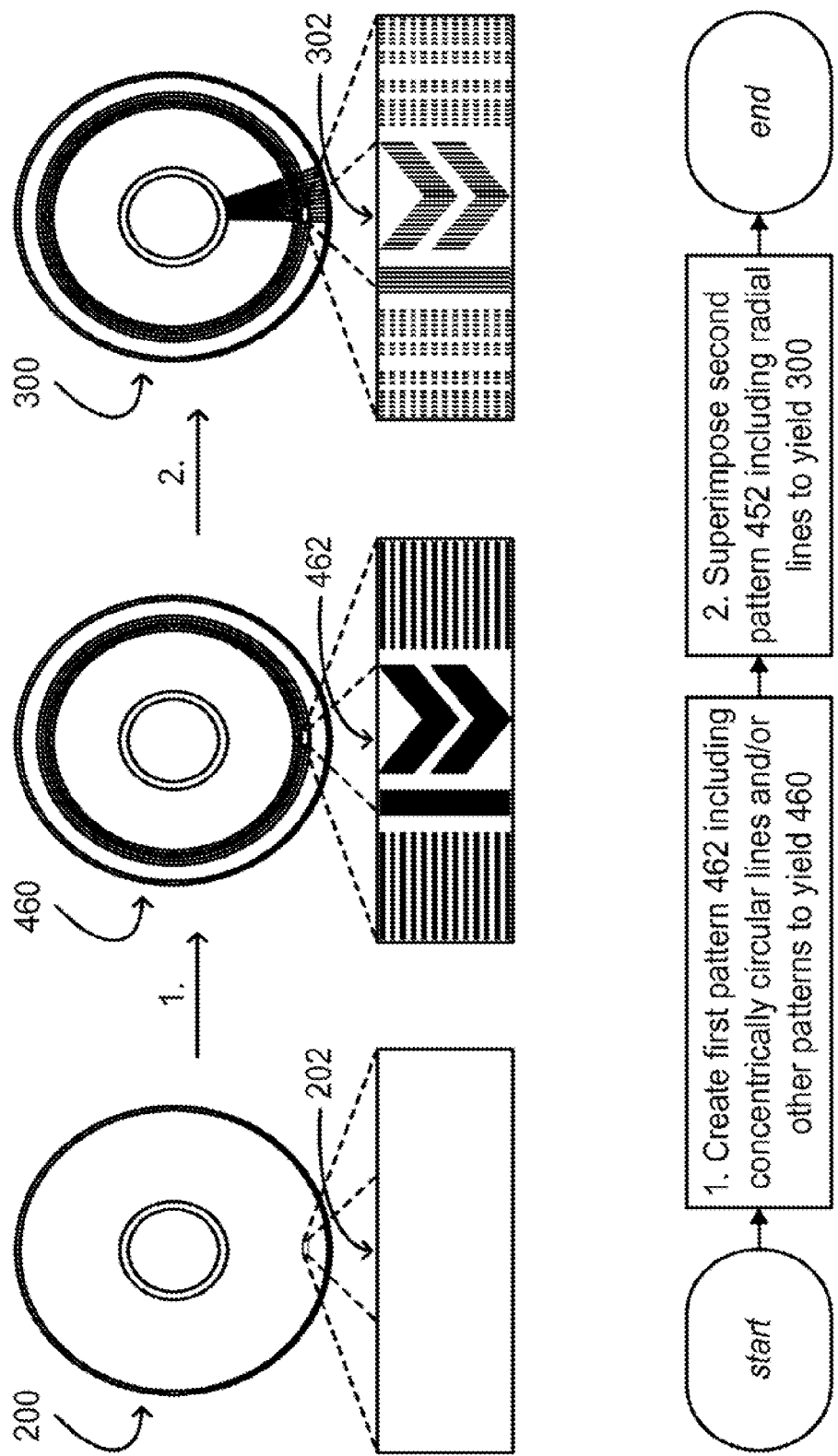

FIG. 4B provides a schematic illustrating template fabrication according to one or more embodiments.

Figure 4C:
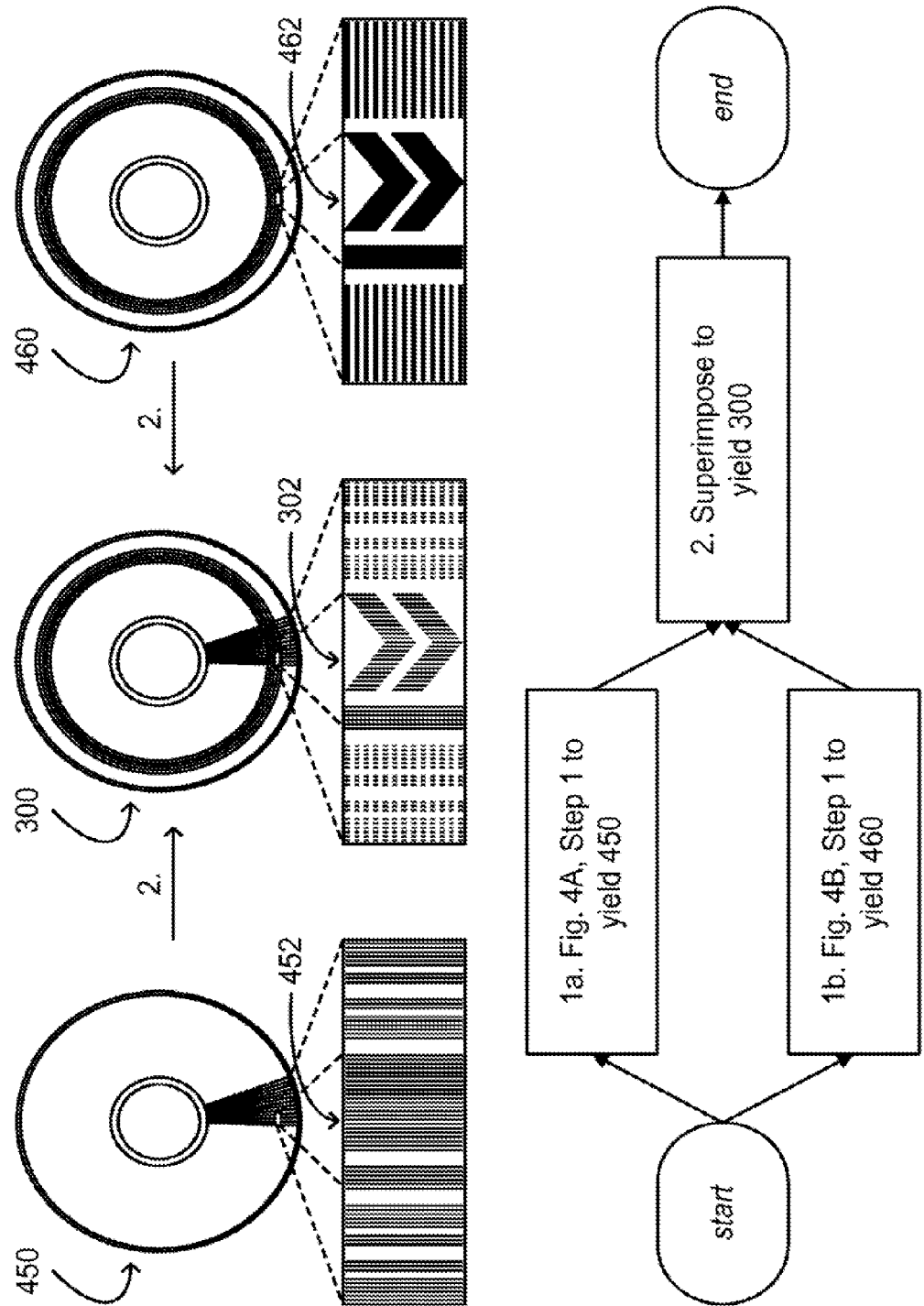

FIG. 4C provides a schematic illustrating template fabrication according to one or more embodiments.

Figure 5A:
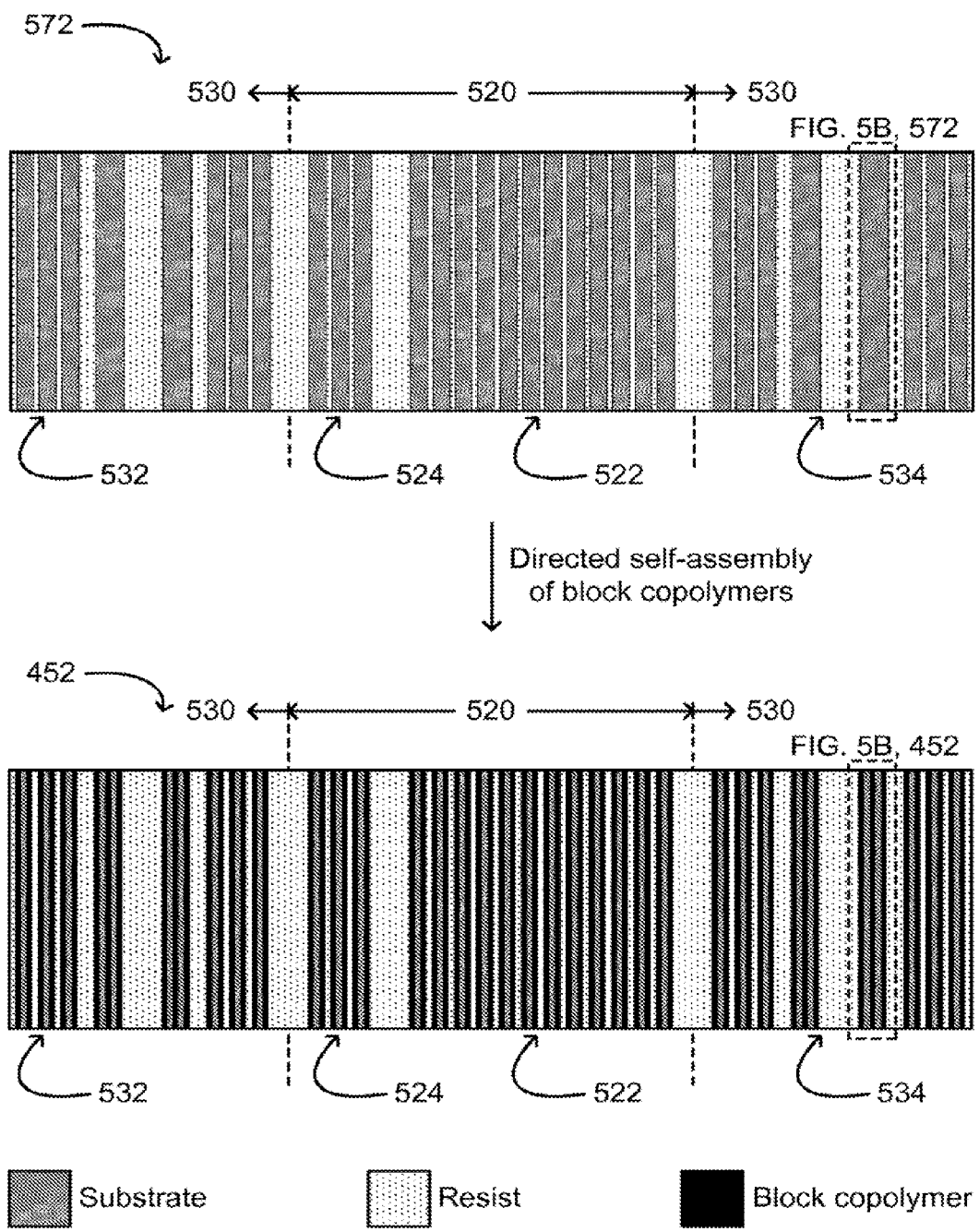

FIG. 5A provides a schematic illustrating sub-template fabrication according to one or more embodiments.

Figure 5B:
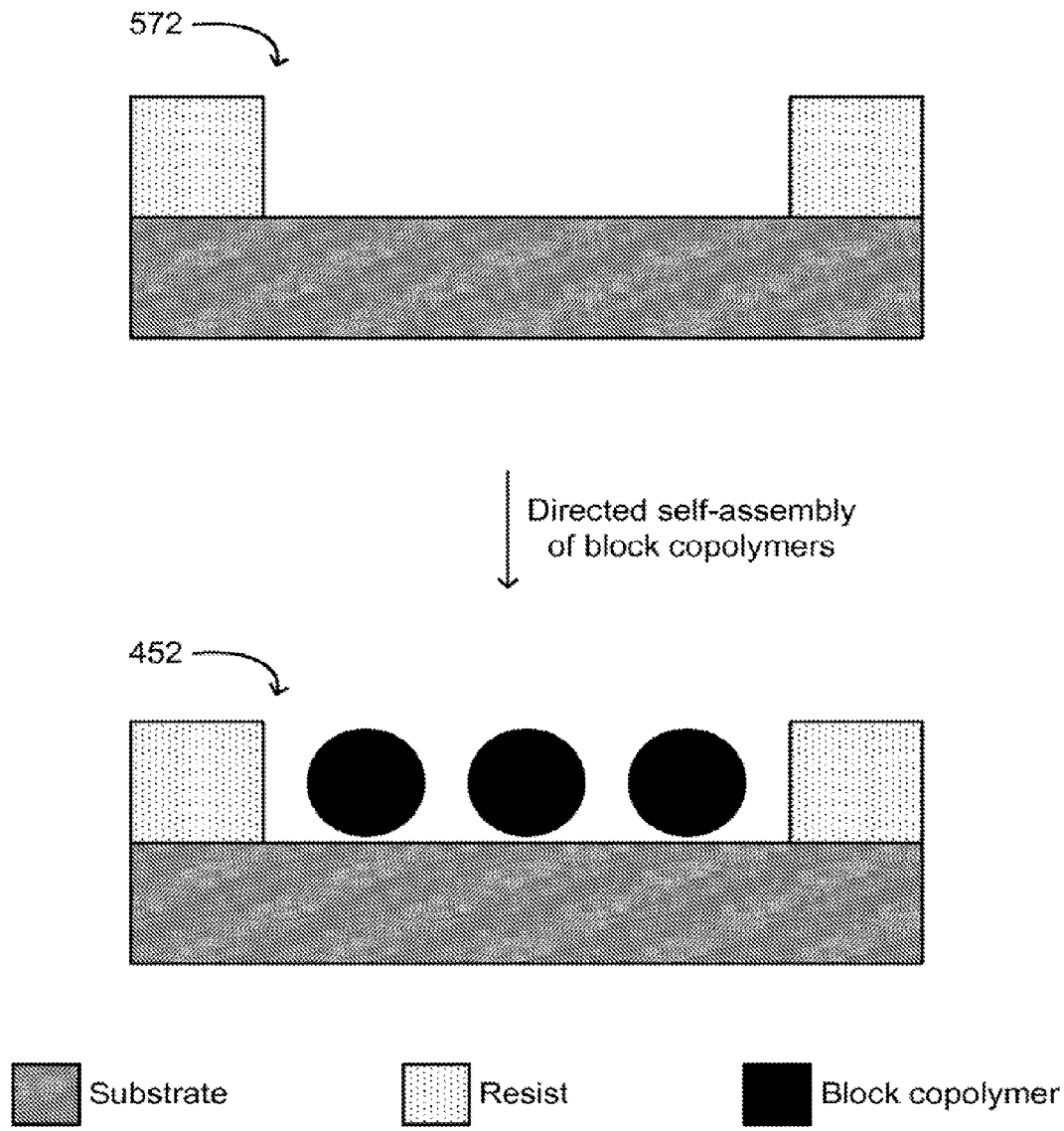

FIG. 5B provides a schematic illustrating sub-template fabrication according to one or more embodiments.

Figure 5C:
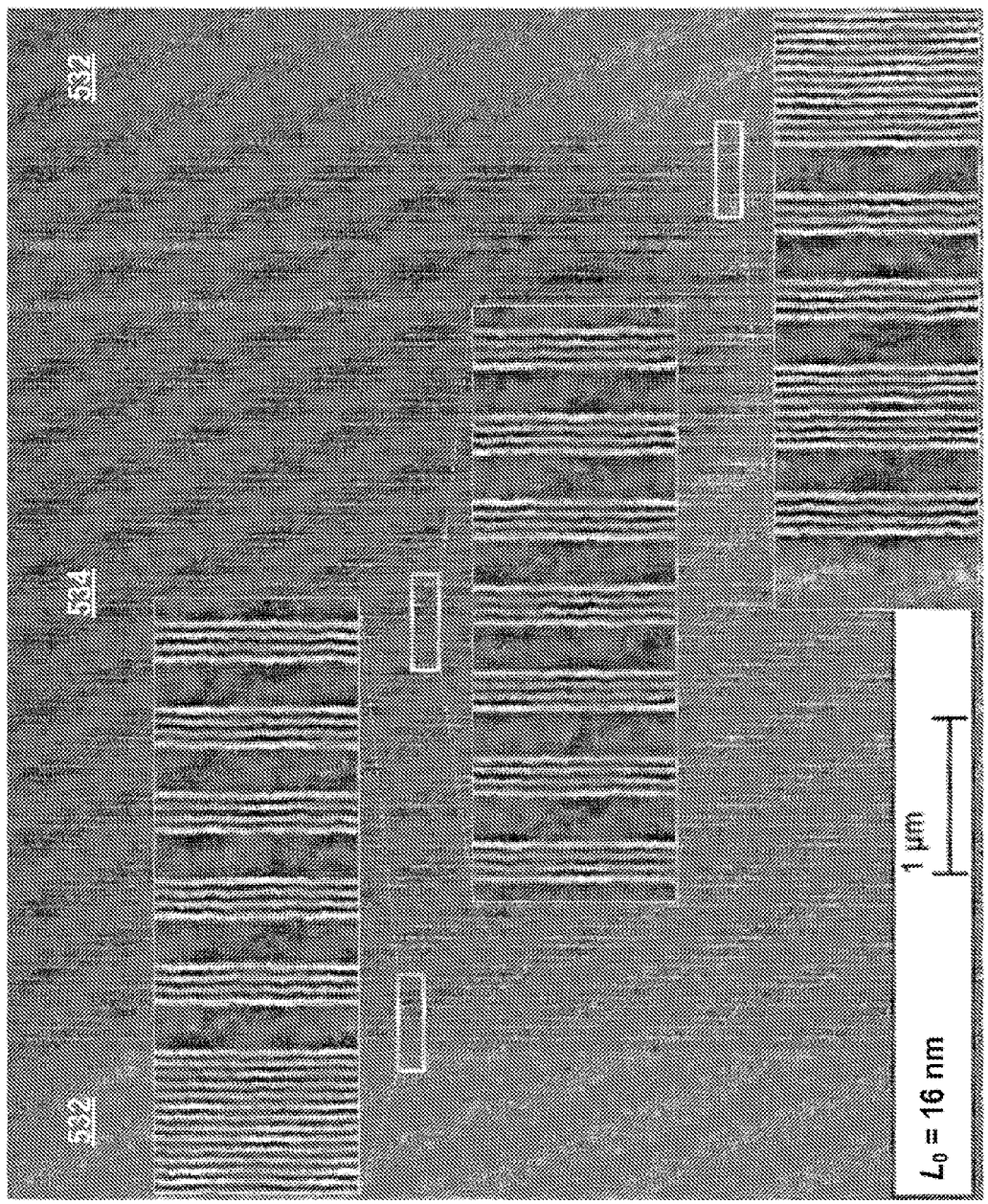

FIG. 5C provides an image of high-resolution radial lines of a block copolymer according to one or more embodiments.

Figure 6A:
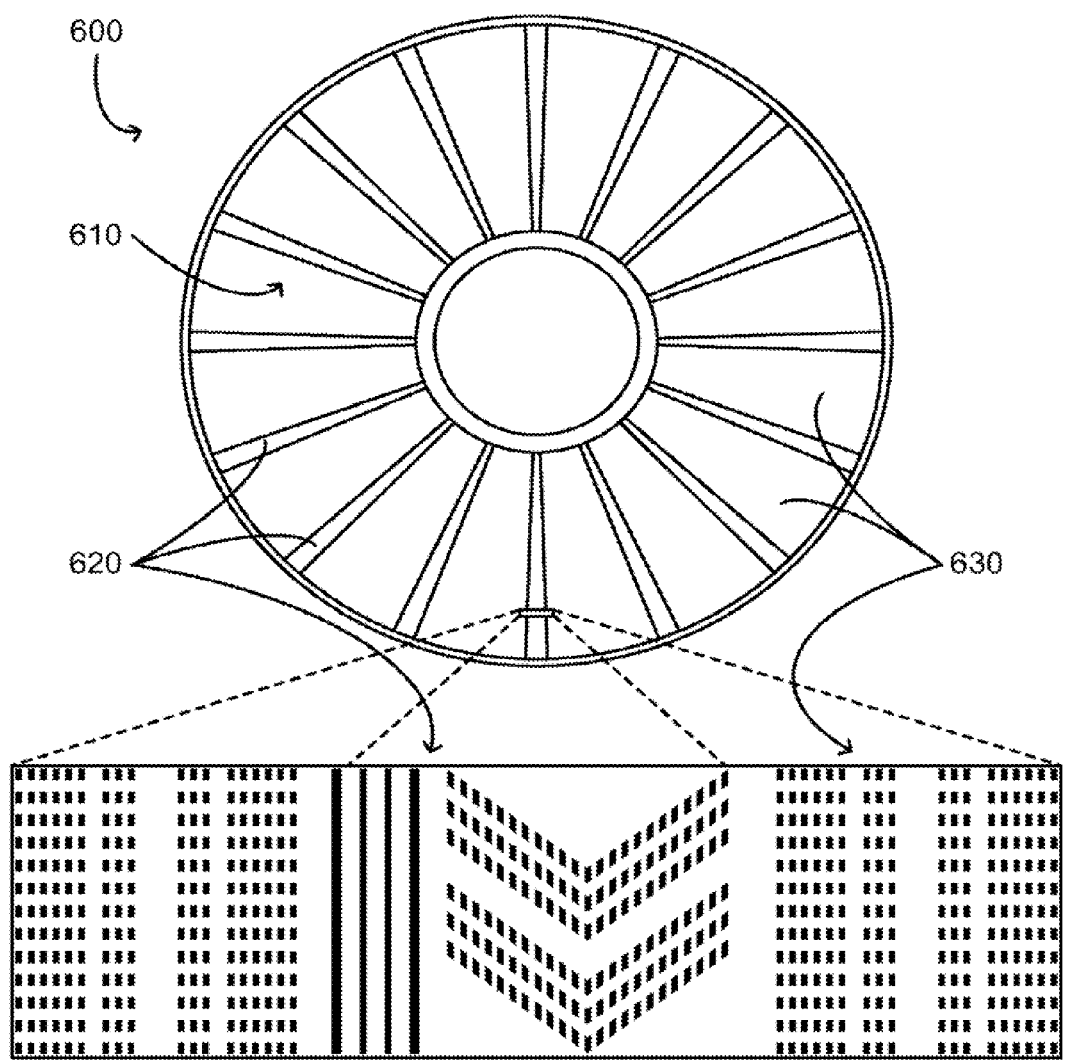

FIG. 6A provides a schematic illustrating a template for a patterned recording medium according to one or more embodiments.

Figure 6B:
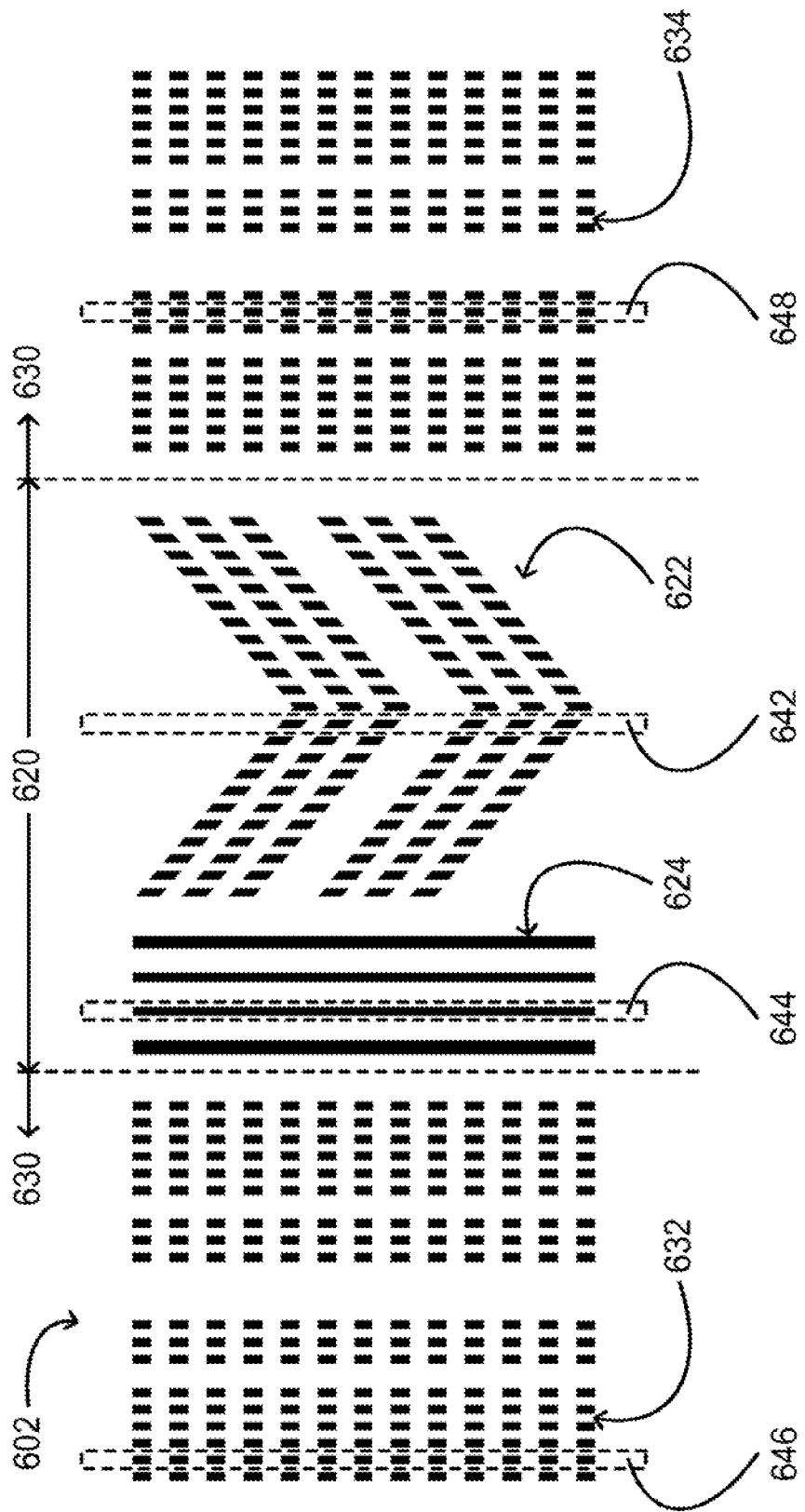

FIG. 6B provides a schematic illustrating a pattern of the template of FIG. 6A according to one or more embodiments.

Figure 7A:
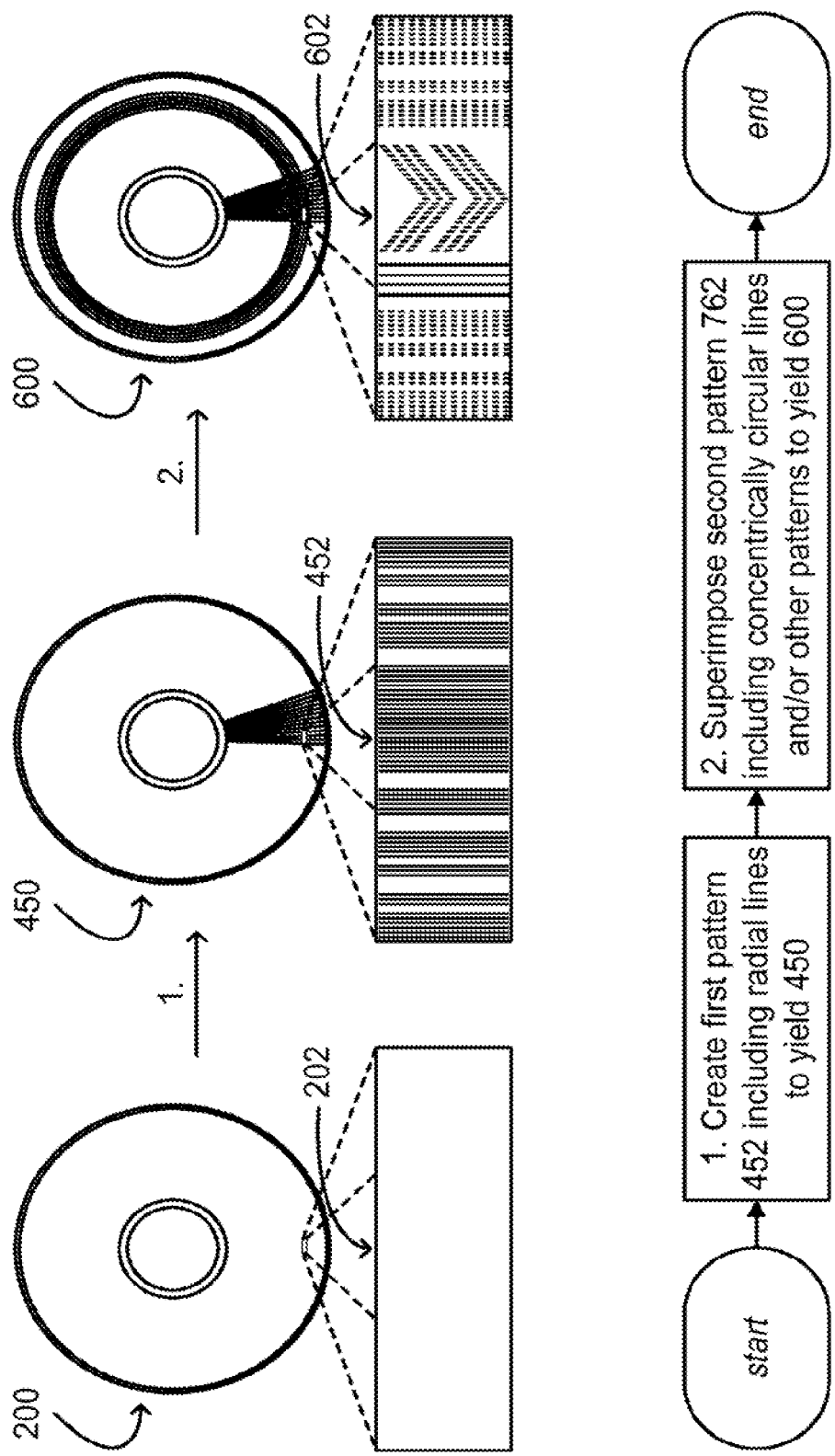

FIG. 7A provides a schematic illustrating template fabrication according to one or more embodiments.

FIG. 7B provides a schematic illustrating template fabrication according to one or more embodiments.

Figure 7C:
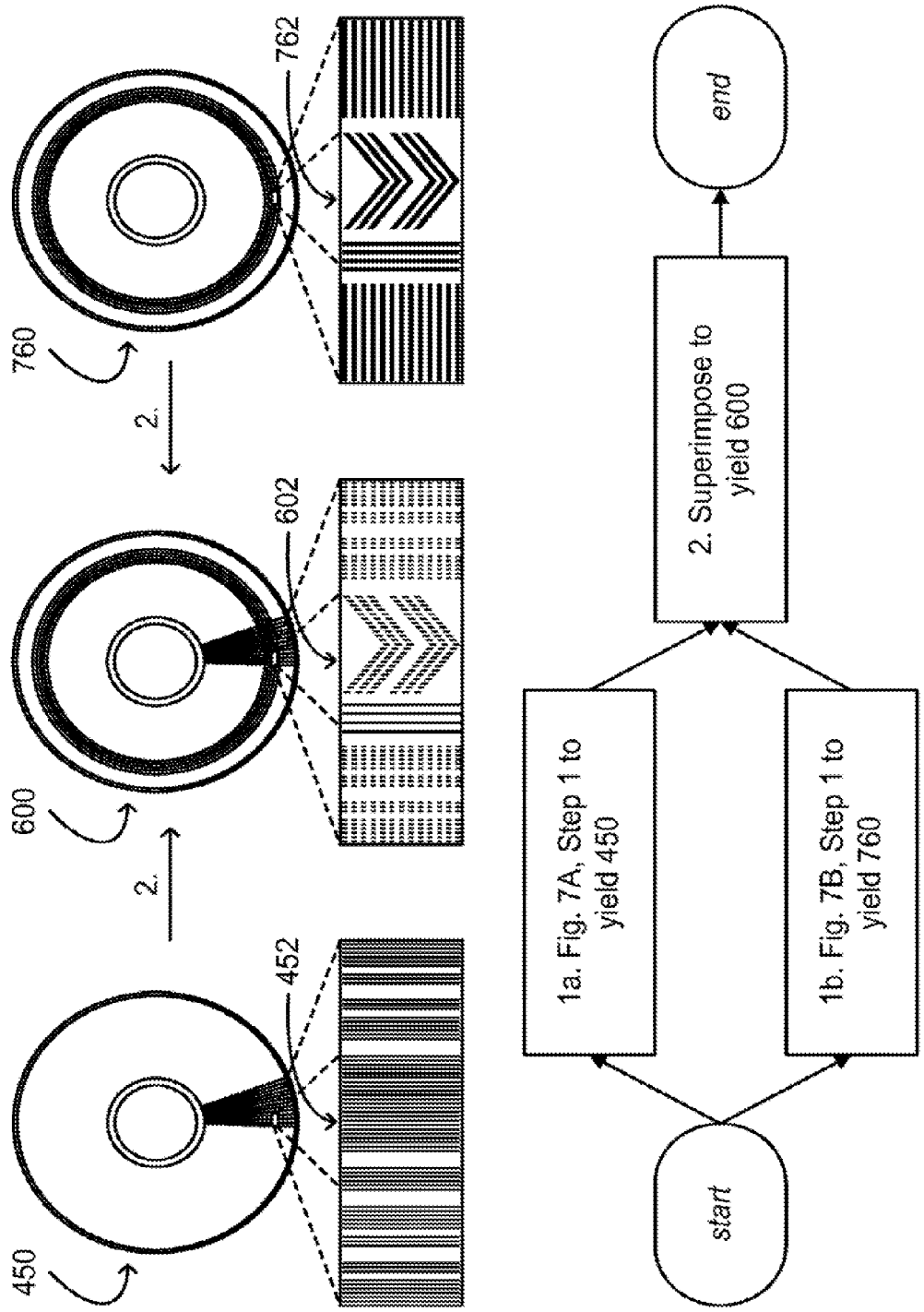

FIG. 7C provides a schematic illustrating template fabrication according to one or more embodiments.

Figure 8A:
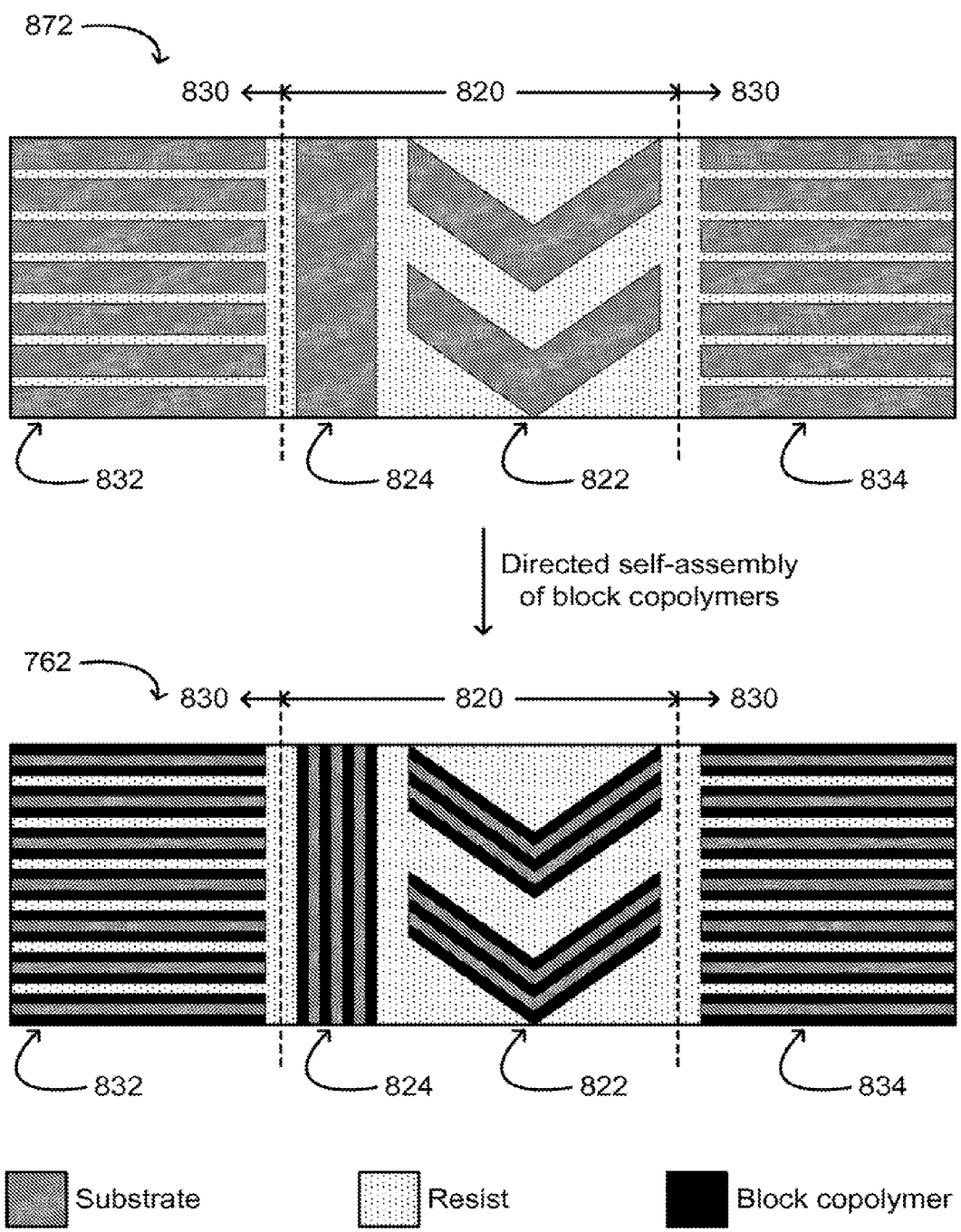

FIG. 8A provides a schematic illustrating sub-template fabrication according to one or more embodiments.

Figure 8B:
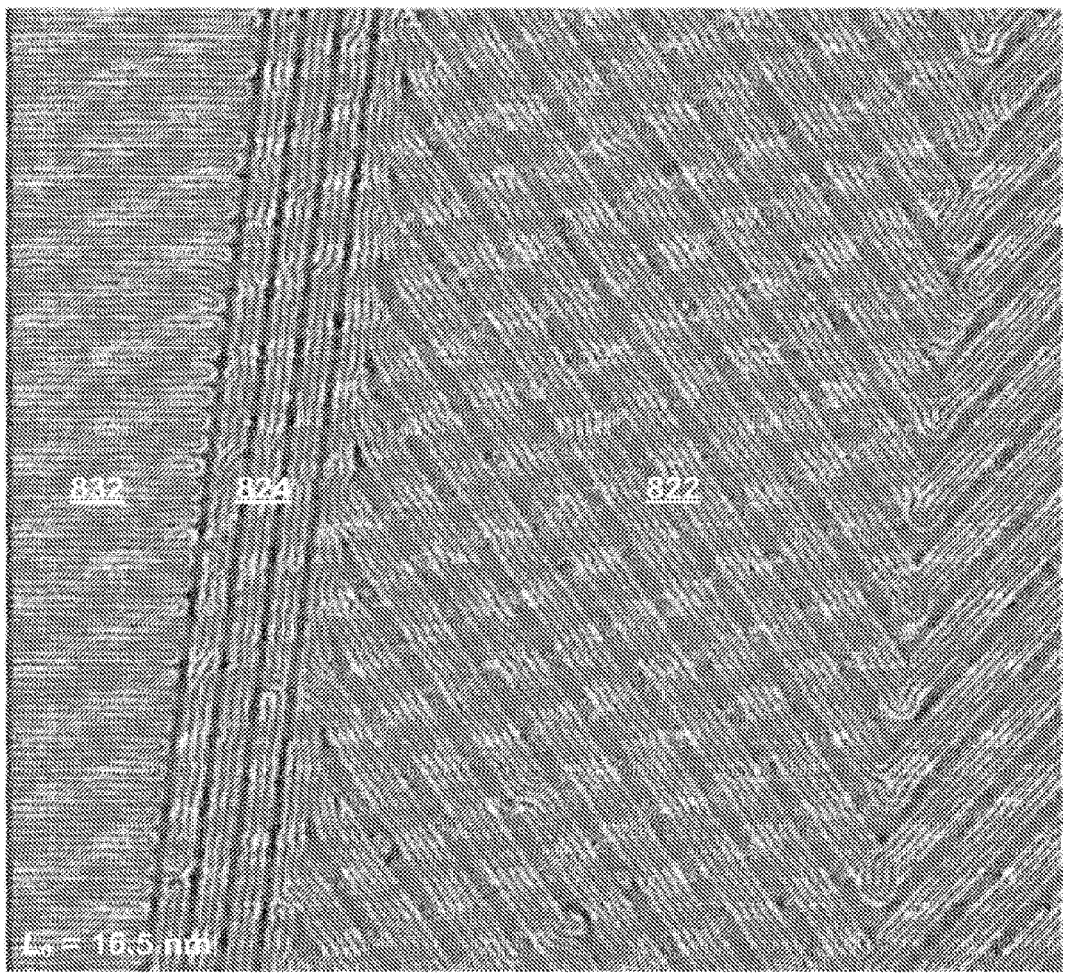

FIG. 8B provides an image of high-resolution lines of a block copolymer according to one or more embodiments.

Figure 8C:
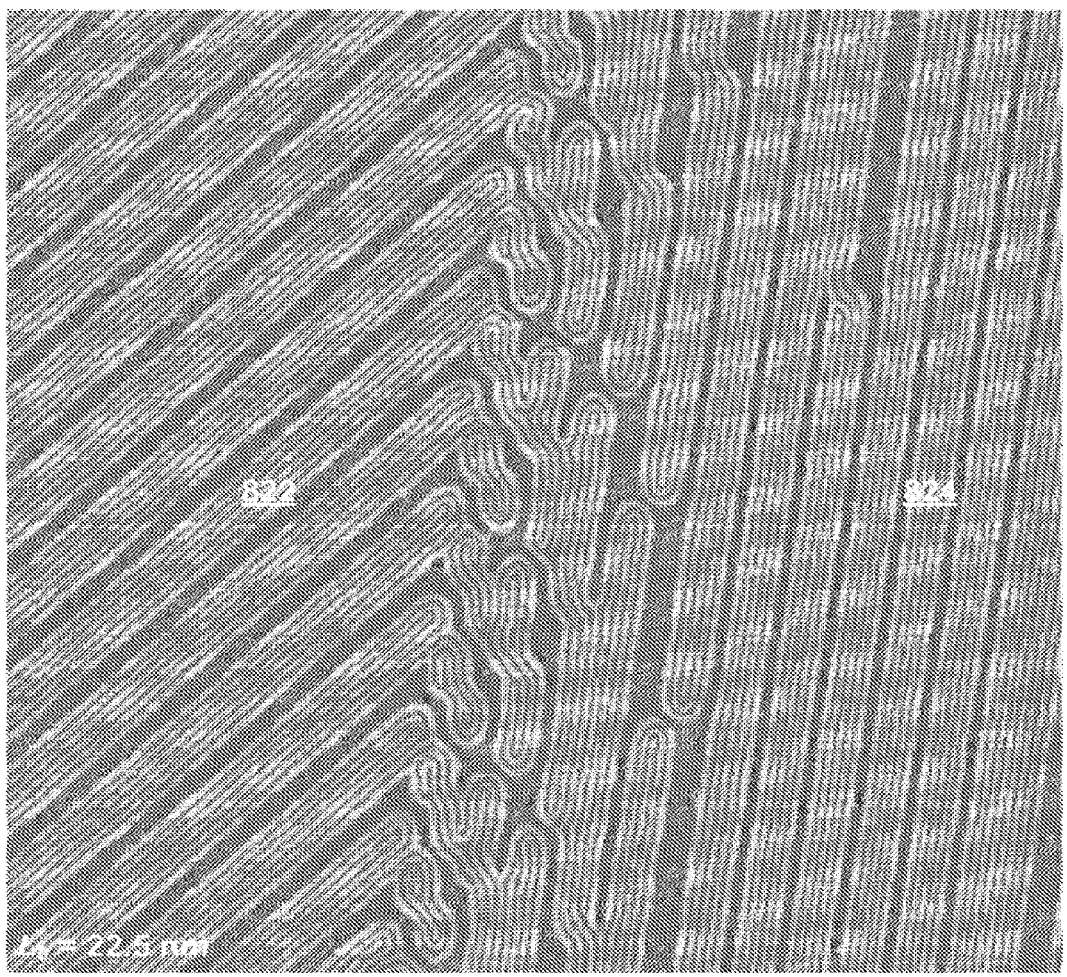

FIG. 8C provides an image of high-resolution lines of a block copolymer according to one or more embodiments.

Figure 8D:
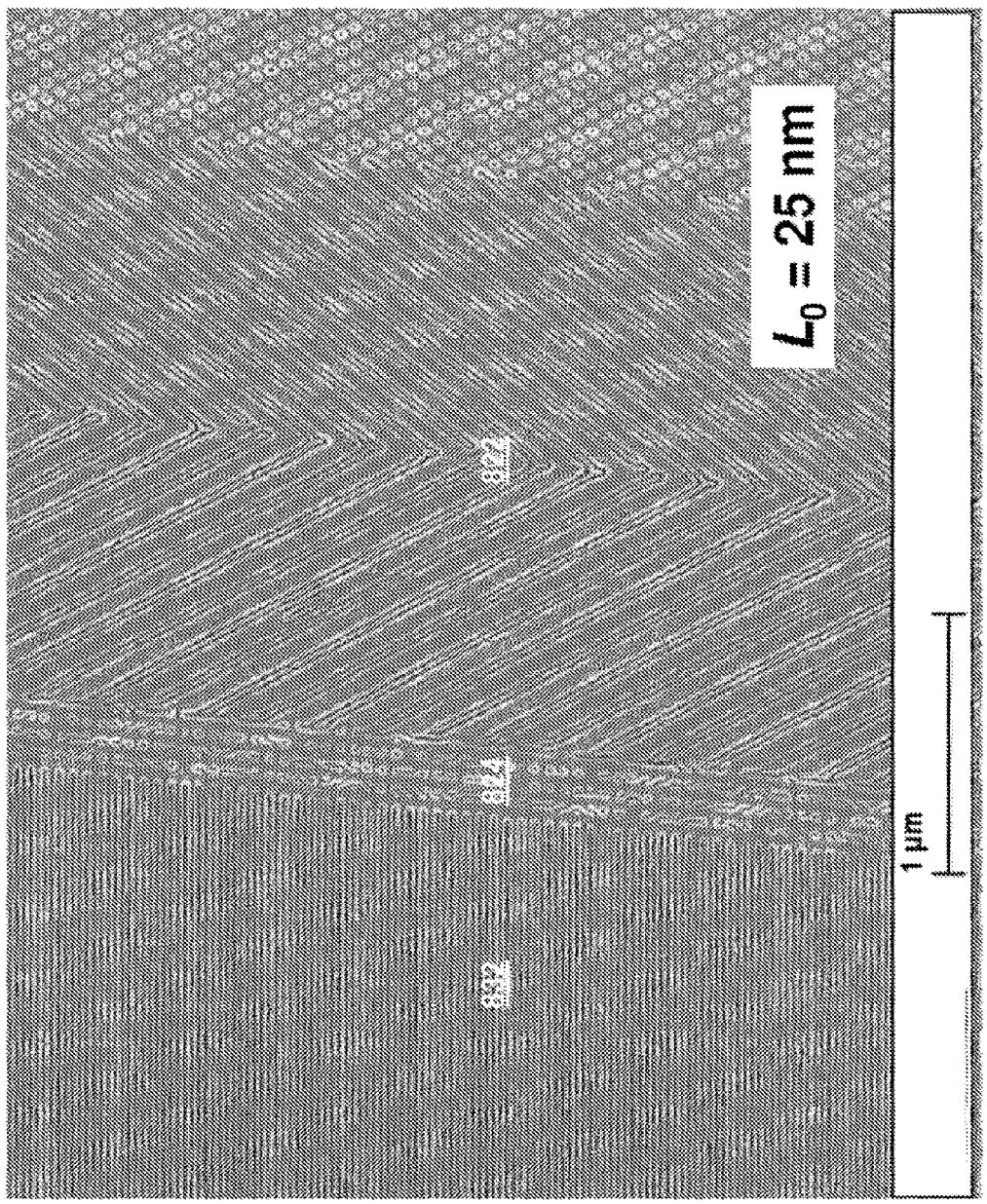

FIG. 8D provides an image of high-resolution lines of a block copolymer according to one or more embodiments.

Figure 9A:
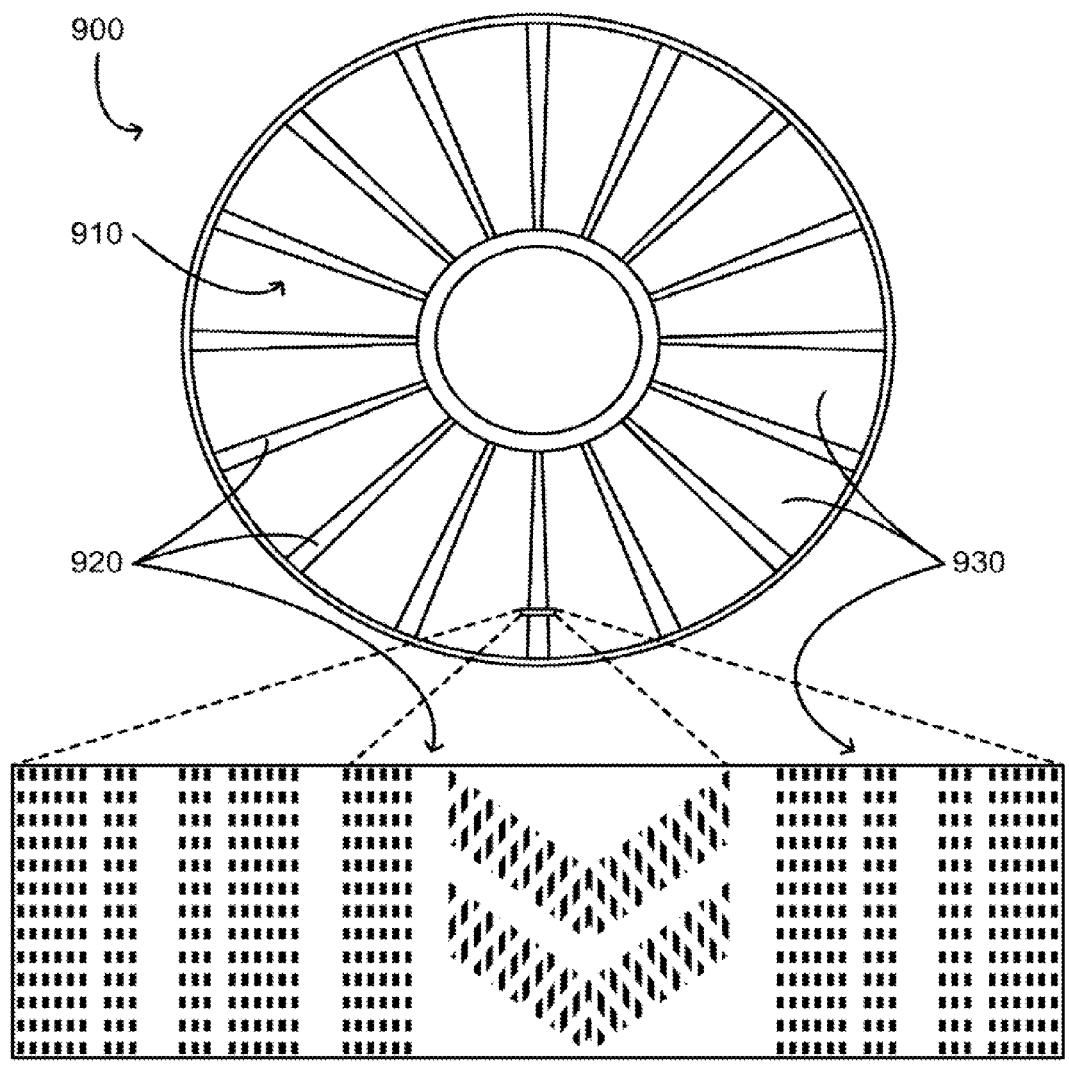

FIG. 9A provides a schematic illustrating a template for a patterned recording medium according to one or more embodiments.

Figure 9B:
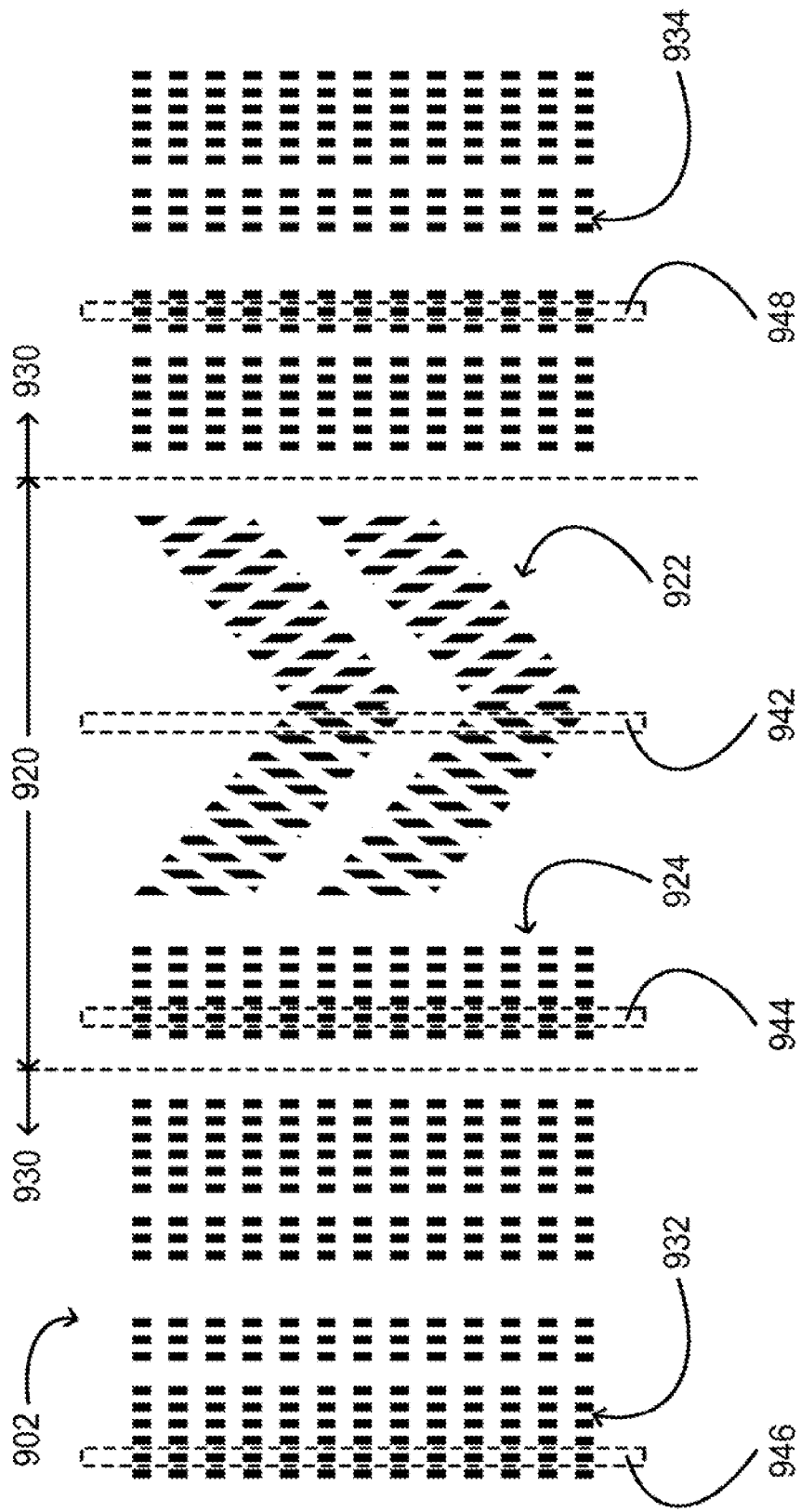

FIG. 9B provides a schematic illustrating a pattern of the template of FIG. 9A according to one or more embodiments.

Figure 10A:
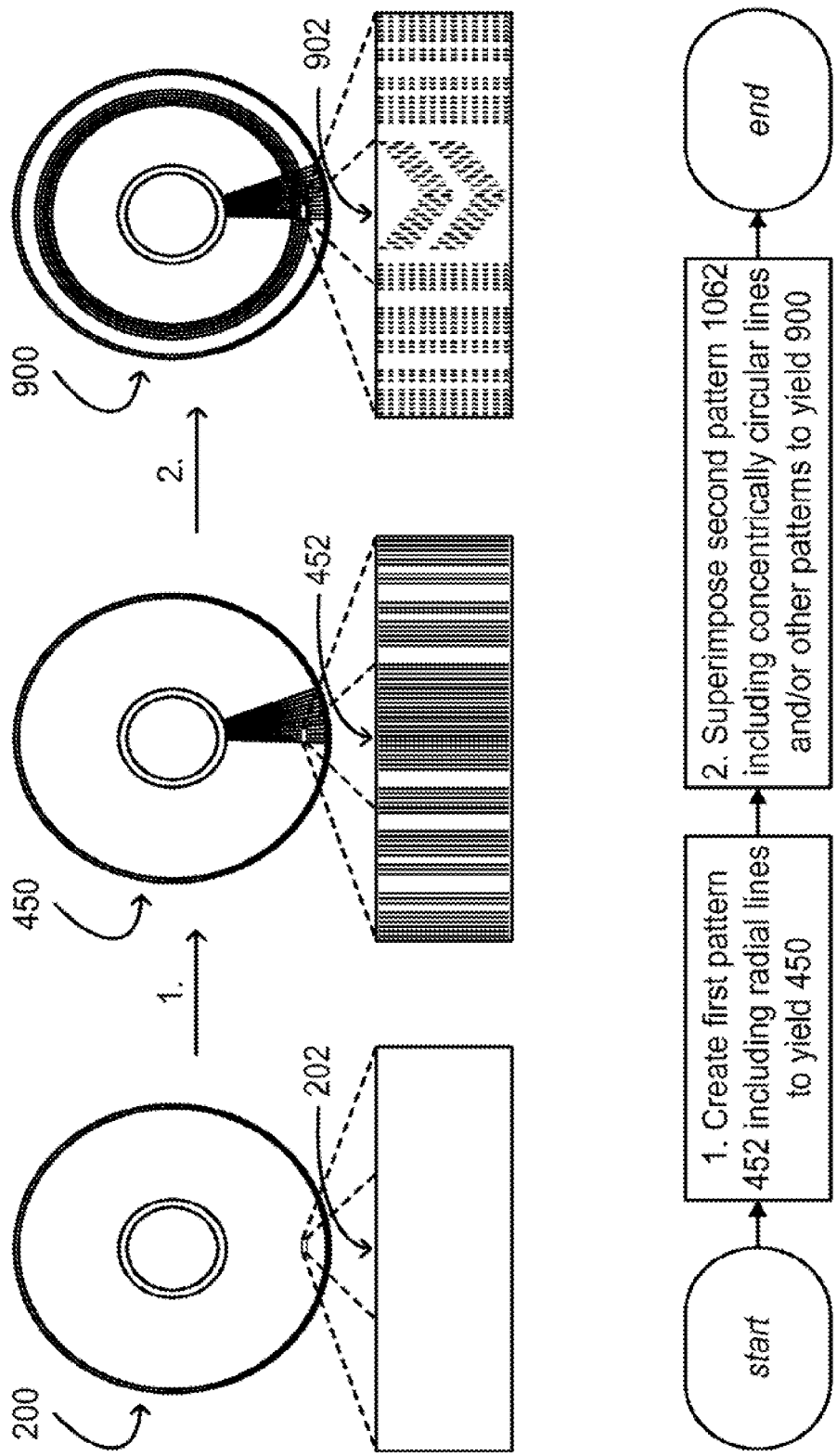

FIG. 10A provides a schematic illustrating template fabrication according to one or more embodiments.

Figure 10B:
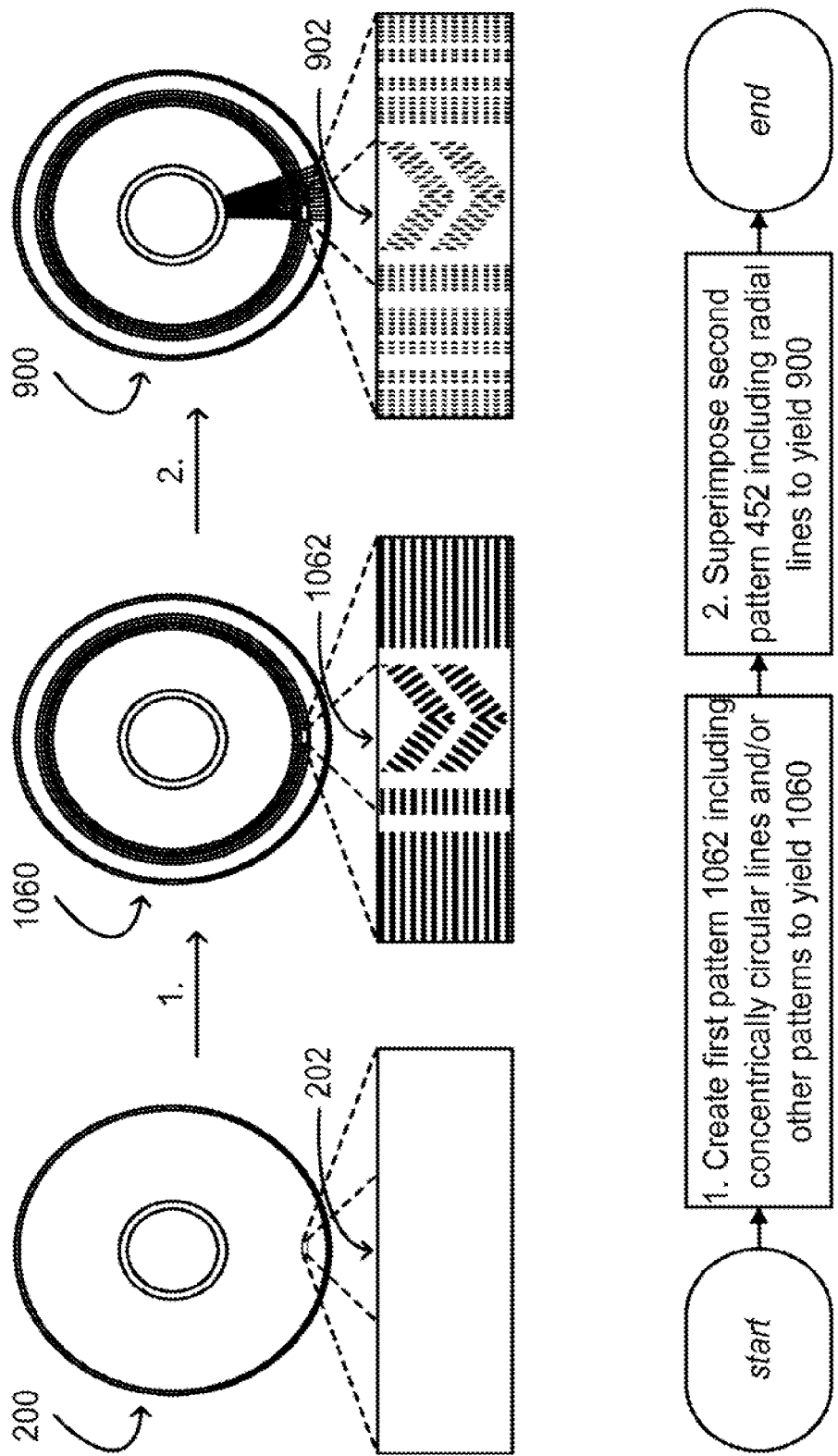

FIG. 10B provides a schematic illustrating template fabrication according to one or more embodiments.

Figure 10C:
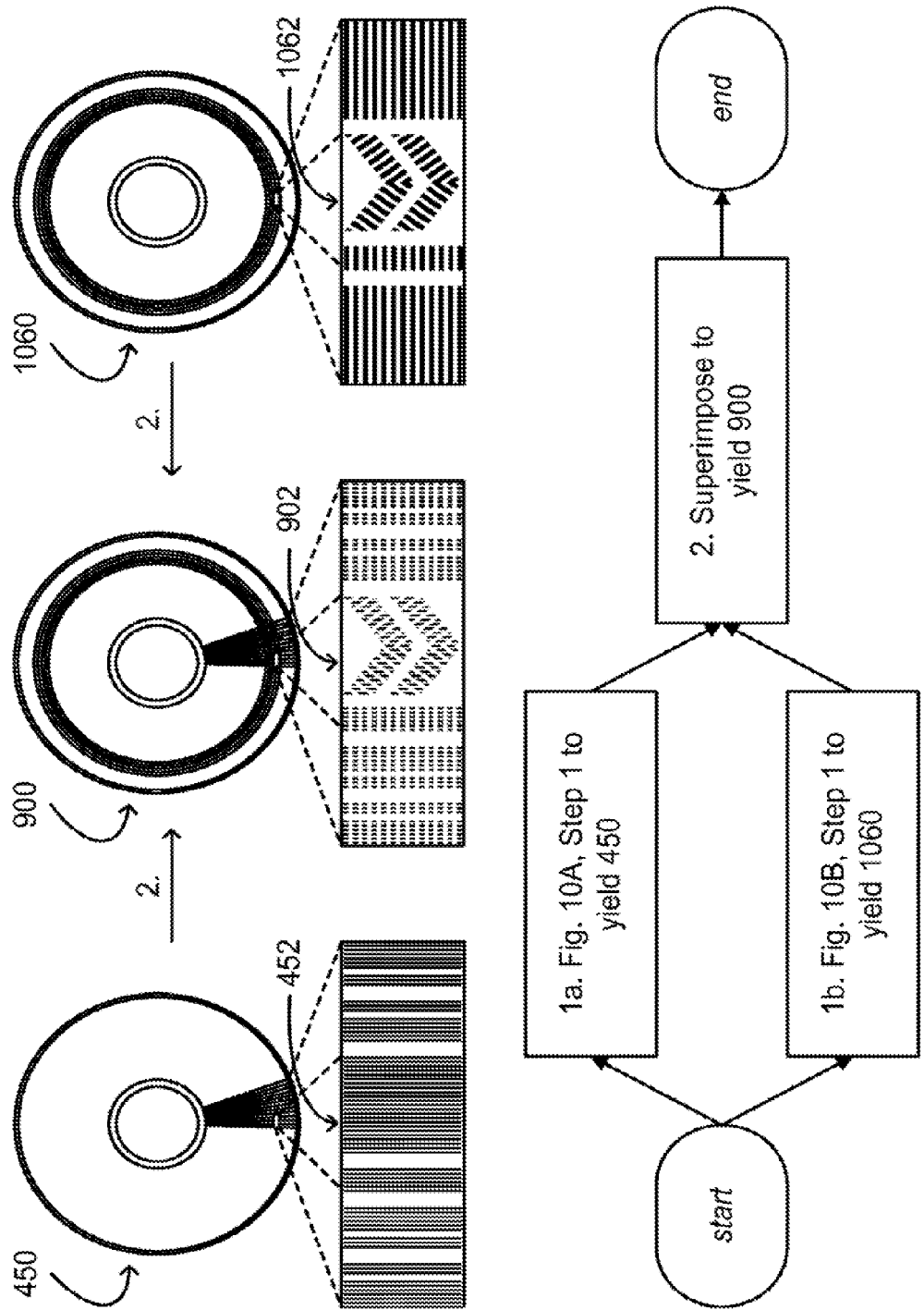

FIG. 10C provides a schematic illustrating template fabrication according to one or more embodiments.

Figure 11A:
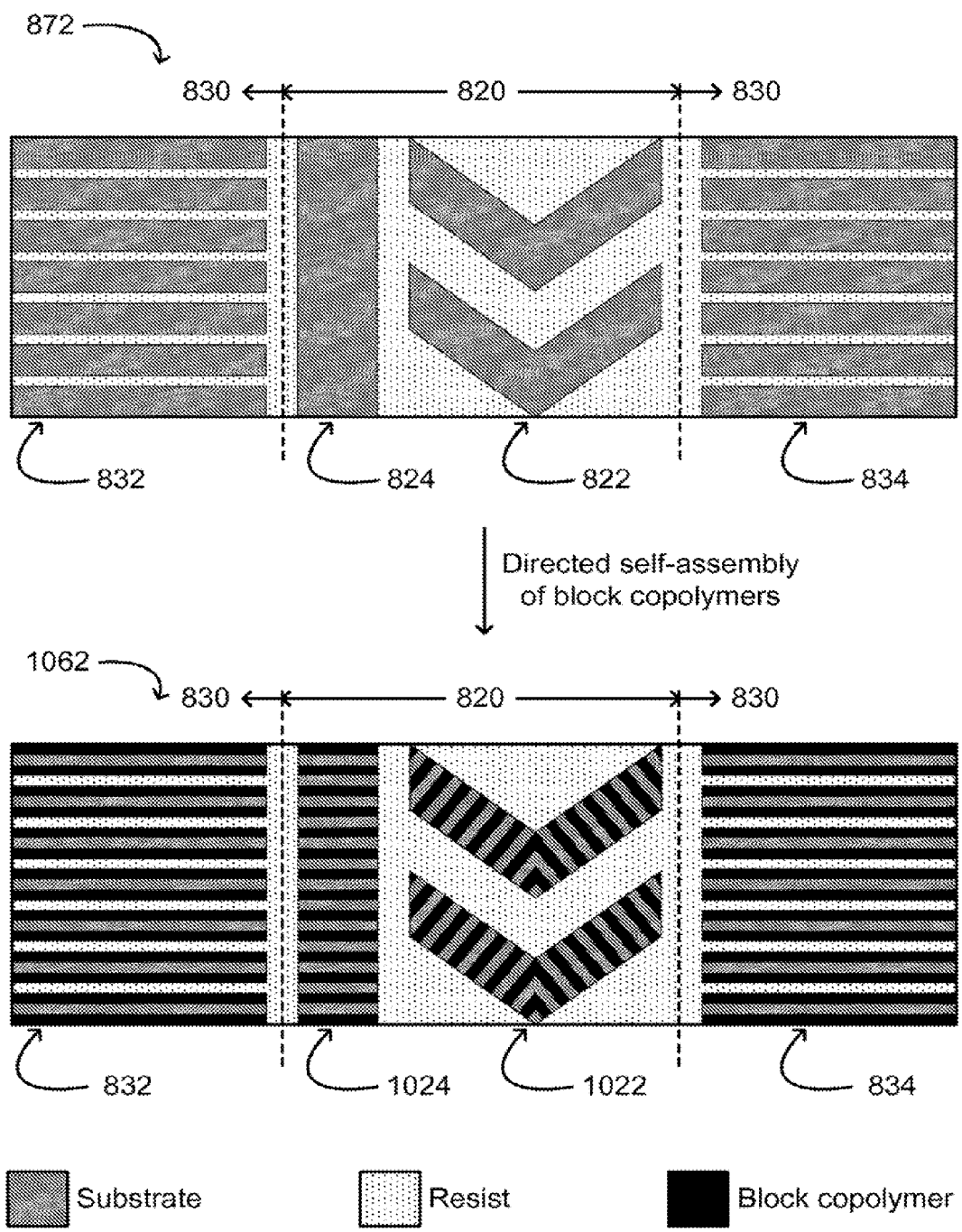

FIG. 11A provides a schematic illustrating sub-template fabrication according to one or more embodiments.

Figure 11B:
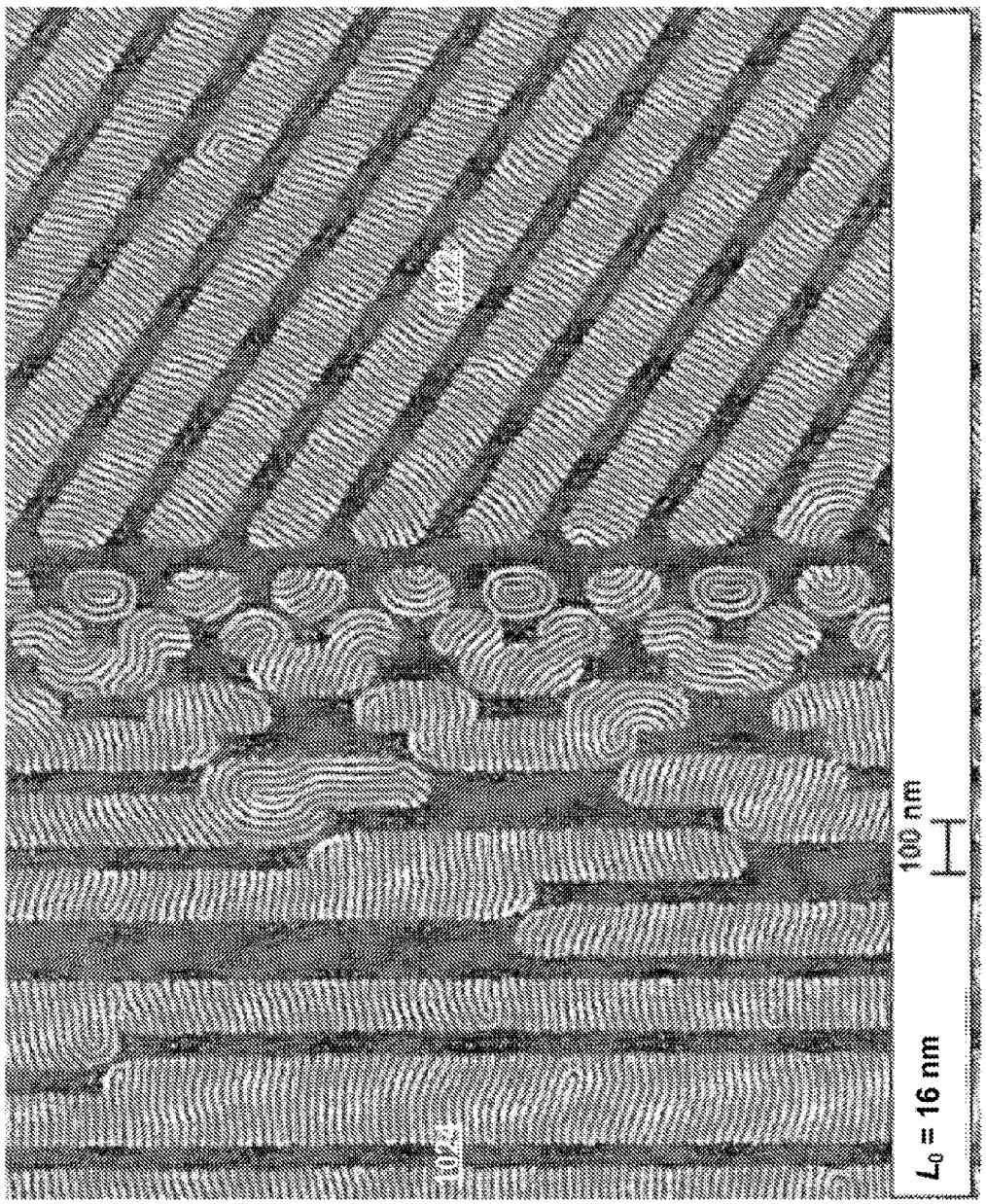

FIG. 11B provides an image of high-resolution lines of a block copolymer according to one or more embodiments.

Figure 12A:
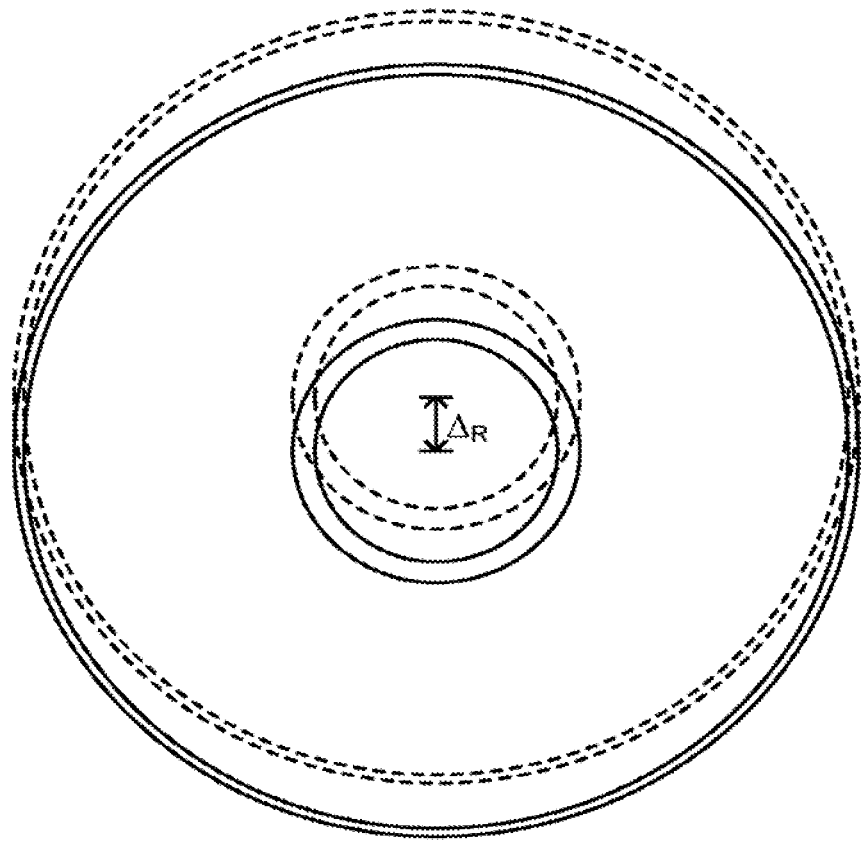

FIG. 12A provides a schematic illustrating radial displacement in template fabrication according to one or more embodiments.

Figure 12B:
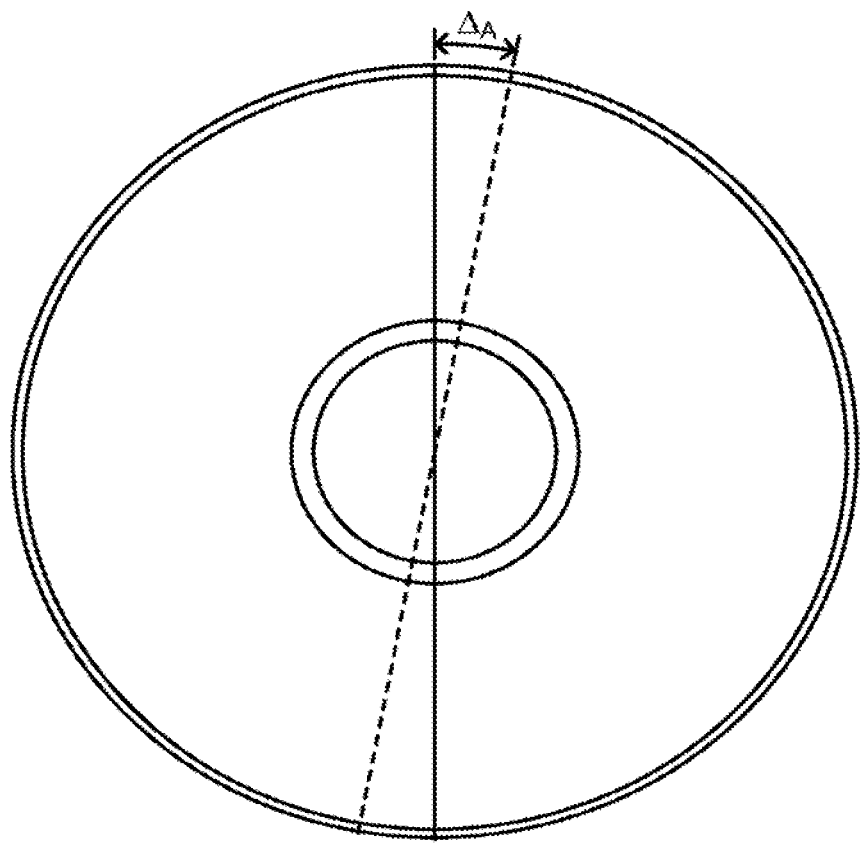

FIG. 12B provides a schematic illustrating angular displacement in template fabrication according to one or more embodiments.

DESCRIPTION

Before some particular embodiments are provided in greater detail, it should be understood by persons having ordinary skill in the art that the particular embodiments do not limit the scope of the concepts provided herein, as features of such particular embodiments may vary. It should likewise be understood that a particular embodiment has features that may be readily separated from the particular embodiment and optionally combined with or substituted for features of any of a number of other embodiments provided herein.

It should also be understood by persons having ordinary skill in the art that the terminology used herein is for the purpose of providing some particular embodiments, and the terminology does not limit the scope of the concepts provided herein. Unless indicated otherwise, ordinal numbers (e.g., first, second, third, etc.) are used to distinguish or identify different features or steps in a group of features or steps, and do not supply a serial or numerical limitation. For example, "first," "second," and "third" features or steps need not necessarily appear in that order, and the particular embodiments need not necessarily be limited to the three features or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It should be understood that while templates for patterned recording media are provided herein, features of a template may directly correspond to features of a patterned recording medium. It should also be understood that while patterned recording media are provided herein, features of a patterned recording medium may directly correspond to features of a template. For example, features provided in reference to protrusions in a template may directly correspond to magnetic features in a patterned recording medium.

Unless defined otherwise, all technical and scientific terms used herein have the same meaning as commonly understood by persons of ordinary skill in the art.

Templates for patterned recording media such as hexagonal BPM may be fabricated by block copolymer DSA to hexagonally arrange sphere-forming block copolymers or cylinder-forming block copolymers. Due to certain requirements of the patterned recording media and/or respective recording devices, such hexagonally arranged block copolymers may need to be skewed from symmetric hexagonal arrangements. However, asymmetric arrangements are typically limited to a skew angle of about 8 degrees. To overcome the skew angle limit, templates for patterned recording media such as rectangular BPM may be fabricated through cross imprinting. However, creation of complex servo patterns remains problematic across hexagonal and rectangular BPM. For example, it is difficult to create complex servo patterns about the natural line structures formed by lamella-forming block copolymer DSA.

Provided herein are apparatus including servo patterns patterned therein and methods related thereto. Apparatus and methods for circumferentially aligned, servo-related features are provided in a first section titled "Circumferentially Aligned, Servo-Related Features." Apparatus and methods for radially aligned, servo-related features are provided in a second section titled "Radially Aligned, Servo-Related Features." However, it should be understood that the scope of the concepts provided herein is not delimited in accordance with the foregoing two-part presentation, as features of one or more particular embodiments in the first section may be readily separated out and combined with or substituted for features in any of a number of particular embodiments in the second section. Likewise, features of one or more particular embodiments in the second section may be readily separated out and combined with or substituted for features in any of a number of particular embodiments in the first section.

Circumferentially Aligned, Servo-Related Features

FIG. 1A provides a non-limiting example of a template 100 corresponding to a patterned recording medium including servo patterns patterned therein. The template 100 may include a template (e.g., microimprint template, nanoimprint template, etc.) for any recording medium or recording media to which lithographic (e.g., microlithographic, nanolithographic, etc.) patterning may be applied or extended. As such, the template 100 may include, but is not limited to, a template for longitudinal magnetic recording ("LMR") media, a template for perpendicular magnetic recording ("PMR") media, a template for heat-assisted magnetic recording ("HAMR") media, a template for discrete track recording ("DTR") media, or a template for bit-patterned media (also "BPM"). In some embodiments, for example, the template 100 may include a template for BPM such as rectangular BPM. It should be understood that the template 100 of FIG. 1A is a schematic provided to aid understanding. As such, the template 100 of FIG. 1A is illustrated without certain features such as features corresponding to zones for zoned bit recording in a patterned recording medium.

The template 100 of FIG. 1A may include a servo scheme 110 patterned therein corresponding to a servo scheme of a patterned recording medium. The servo patterns of the servo scheme 110 may be part of any servo scheme. As such, the servo scheme 110 may include, but is not limited to, a wedge servo scheme, an embedded servo scheme, or a dedicated servo scheme. In some embodiments, for example, the servo patterns may be part of an embedded servo scheme such as the embedded servo scheme 110 of FIG. 1A. Because the template 100 of FIG. 1A is a schematic without certain features such as features corresponding to zones for zoned bit recording in a patterned recording medium, it should also be understood that the servo scheme 110 is not limited to the layout of FIG. 1A. The servo scheme 110 of FIG. 1A, or any other servo scheme for a patterned recording medium, including, but not limited to the foregoing, may have a layout in accordance with zone bit recording.

The template 100 of FIG. 1A may include servo regions or servo sectors 120 alternately arranged with data regions or data sectors 130 patterned therein corresponding to a patterned recording medium. The servo sectors 120 may include any servo sector fields necessary to support servo functions of a recording device in which a patterned recording medium corresponding to the template 100 is used. As such, the servo sector fields may include, but are not limited to, one or more servo sector fields selected from a sync field including a phase-locked loop ("PLL") field or an interspersed PLL ("iPLL") field, an adaptive gain control ("AGC") field, and/or a preamble field; a servo address mark ("SAM") field or servo index mark ("SIM") field; a Gray-coded track identification field; and a position error signal ("PES") burst pattern field. In some embodiments, for example, the servo sectors 120 may include the PES burst pattern field of FIG. 1A, which PES burst pattern field is provided as the PES burst pattern field 122 of FIG. 1B. In some embodiments, for example, the servo sectors 120 may include the SAM field of FIG. 1A, which SAM field is provided as the SAM field 124 of FIG. 1B.

It should be understood that the servo sector fields including related fields necessary to support servo functions of a recording device in which a corresponding patterned recording medium is used need not be limited to the servo sectors 120. In some embodiments, for example, the data sectors 130 may include the PLL or iPLL fields of FIG. 3B, one of which PLL or iPLL fields is provided as the iPLL field 334 of FIG. 3B.

FIG. 1B provides a non-limiting example of a pattern 102 (or portion thereof) of the template 100 of FIG. 1A corresponding to a pattern (or portion thereof) of a patterned recording medium including servo sectors 120 patterned therein. While the servo sectors 120 may include any recording device-necessitated servo sector fields, a PES burst pattern field 122 and a SAM field 124 are illustrated in FIG. 1B as an example. The PES burst pattern field 122 may include any of a number of patterned features, including, but not limited to, patterned chevrons, one of which is illustrated in FIG. 1B inclusively between tracks 142 and 144. The patterned chevrons may include any of a number of different protrusions, including, but not limited to, one or more protrusions selected from triangular protrusions, rhomboidal protrusions, and trapezoidal protrusions. For example, the track 142 includes rhomboidal protrusions and trapezoidal protrusions in the PES burst pattern field 122, and the track 144 includes triangular protrusions and rhomboidal protrusions in the PES burst pattern field 122. The SAM field 124 may include any of a number of patterned features, including, but not limited to, patterned radial lines, two of which are illustrated in FIG. 1B. The patterned radial lines may include rectangular protrusions. For example, the track 142 includes two rectangular protrusions in the SAM field 124, one rectangular protrusion each for the patterned radial lines illustrated in FIG. 1B.

The protrusions of a servo sector and/or the one or more servo sector fields thereof may be circumferentially aligned in accordance with one or more methods of fabrication provided herein. For example, the track 142 of FIG. 1B includes rhomboidal protrusions and trapezoidal protrusions in the PES burst pattern field 122, and the track 142 of FIG. 1B includes rectangular protrusions in the SAM field 124, all of which protrusions are circumferentially aligned along the track 142. For example, the track 144 includes triangular protrusions and rhomboidal protrusions in the PES burst pattern field 122, and the track 144 includes rectangular protrusions in the SAM field 124, all of which protrusions are circumferentially aligned along the track 144.

The protrusions of a servo sector may be dimensioned such that corresponding magnetic features in a patterned recording medium are thermally stable. Accordingly, single magnetic domains corresponding to magnetic features in a patterned recording medium may be thermally stable to reversal and/or to splitting into smaller magnetic domains under normal operating conditions for a patterned recording medium in a recording device. In some embodiments, for example, the protrusions of a servo sector may be about 10 nm in a minor dimension or a down-track direction. In some embodiments, for example, the protrusions of a servo sector may be no more than about 100 nm, 90 nm, 80 nm, 70 nm, 60 nm, 50 nm, 40 nm, 30 nm, 20 nm, or 10 nm in a major dimension or a cross-track direction. Combinations of the foregoing may be used to describe the dimensions of the protrusions of a servo sector. In some embodiments, for example, the protrusions of a servo sector may be about 10 nm in a minor dimension and no more than about 100 nm in a major dimension, including about 10 nm in a minor dimension and no more than about 80 nm in a major dimension, including about 10 nm in a minor dimension and no more than about 60 nm in a major dimension, including about 10 nm in a minor dimension and no more than about 40 nm in a major dimension, and including about 10 nm in a minor dimension and no more than about 20 nm in a major dimension.

FIG. 1B provides a non-limiting example of a pattern 102 (or portion thereof) of the template 100 of FIG. 1A corresponding to a pattern (or portion thereof) of a patterned recording medium including data sectors 130 patterned therein. While the data sectors 130 may include any recording device-necessitated data fields and optional intervening servo sector fields (e.g., PLL or iPLL fields), a data field 132 is illustrated in FIG. 1B as an example. The data field 132 may include any arrangement of protrusions, including, but not limited to, a rectangular array (or pseudo-rectangular array) of protrusions consistent with magnetic features of a rectangular BPM as illustrated in FIG. 1B. The rectangular array of protrusions may include any of a number of different protrusions, including, but not limited to, rectangular protrusions, which include square protrusions. For example, the track 142 of FIG. 1B includes a number of such rectangular protrusions, one rectangular protrusion for each patterned radial line in the rectangular array of protrusions.

The protrusions of a data sector may be circumferentially aligned in accordance with one or more methods of fabrication provided herein. For example, the track 142 of FIG. 1B includes rectangular protrusions, all of which protrusions are circumferentially aligned along the track 142. For example, the track 144 of FIG. 1B includes rectangular protrusions, all of which protrusions are circumferentially aligned along the track 144.

The protrusions of a data sector may be dimensioned such that corresponding magnetic features in a patterned recording medium may have a bit aspect ratio ("BAR") between about 1 and 4, wherein the BAR is a ratio of dimensions corresponding to a ratio of a major dimension or a cross-track direction to a minor dimension or a down-track direction. In some embodiments, for example, the protrusions of a data sector may be dimensioned such that corresponding magnetic features in a patterned recording medium may have a BAR between about 1 and 4, including a BAR between about 1 and 3, and including a BAR between about 1 and 2. Such as BAR is favorable to both fabrication of read-write heads for recording devices and fabrication of templates in accordance with one or more methods provided herein. In some embodiments, for example, the protrusions of a data sector may be about 10 nm in a minor dimension or a down-track direction. In some embodiments, for example, the protrusions of a data sector may be no more than about 40 nm, 30 nm, 20 nm, or 10 nm in a major dimension or a cross-track direction. Combinations of the foregoing may be used to describe the dimensions of the protrusions of a data sector. In some embodiments, for example, the protrusions of a data sector may be about 10 nm in a minor dimension and no more than about 40 nm in a major dimension, including about 10 nm in a minor dimension and no more than about 30 nm in a major dimension, including about 10 nm in a minor dimension and no more than about 20 nm in a major dimension, and including about 10 nm in a minor dimension and no more than about 10 nm in a major dimension.

A data sector may be regular with respect to the pattern of protrusions. For example, the rectangular array of protrusions in the data field 132 of FIG. 1B has regularly repeating rectangular protrusions in each of the cross-track and down-track directions. Comparatively, a servo sector may be irregular with respect to the pattern of protrusions, which may include, but is not limited to, different protrusions within a servo sector field, different protrusions in a cross-track direction, and/or different protrusions in a down-track direction. With respect to different protrusions within a servo sector field, for example, the protrusions in the PES burst pattern field 122 of FIG. 1B include triangular protrusions, rhomboidal protrusions, and trapezoidal protrusions. With respect to different protrusions in a down-track direction, for example, the protrusions in the track 144 of FIG. 1B include triangular protrusions and rhomboidal protrusions of the PES burst pattern field 122 and rectangular protrusions of the SAM field 124.

A data sector may be dense with respect to the number of protrusions per unit area and/or the total surface area of protrusions per unit area. Comparatively, a servo sector may be sparse with respect to the number of protrusions per unit area and/or the total surface area of protrusions per unit area. For example, the number of protrusions in the data sector 130 of FIG. 1B is greater than the number of protrusions in the servo sector 120 for about the same unit area.

A data sector and/or the protrusions therein may be circumferentially aligned with a servo sector and/or the protrusions therein in accordance with one or more methods of fabrication provided herein. For example, the track 142 of FIG. 1B includes a number of rectangular protrusions in the data sector 130 and a number of rhomboidal protrusions, trapezoidal protrusions, and rectangular protrusions in the servo sector 120, all of which protrusions are circumferentially aligned along the track 142. For example, the track 144 of FIG. 1B includes a number of rectangular protrusions in the data sector 130 and a number of rhomboidal protrusions, triangular protrusions, and rectangular protrusions in the servo sector 120, all of which protrusions are circumferentially aligned along the track 144.

FIG. 2A provides a non-limiting example of template fabrication for a patterned recording medium including servo patterns patterned therein. In a first step, a first pattern 252 of relatively high resolution may be created on a substrate 200 in a to-be-patterned area 202 to provide a sub-template 250 including the first pattern 252. In a second step, a second pattern 262 (see FIG. 2B) of relatively high resolution in nascent data sectors and relatively low resolution in nascent servo sectors may be superimposed on the sub-template 250 to provide, subsequent to etching, the template 100 including a superimposed pattern 102, wherein the superimposed pattern 102 is characteristic of the superimposition of the second pattern 262 on the first pattern 252. As provided herein, superimposition of the second pattern 262 on the first pattern 252 creates, subsequent to etching, circumferentially aligned protrusions of optionally different dimensions across the template 100.

FIG. 2B provides a non-limiting example of template fabrication for a patterned recording medium including servo patterns patterned therein. In a first step, a first pattern 262 of relatively high resolution in nascent data sectors and relatively low resolution in nascent servo sectors may be created on a substrate 200 in a to-be-patterned area 202 to provide a sub-template 260 including the first pattern 262. In a second step, a second pattern 252 (see FIG. 2A) of relatively high resolution may be superimposed on the sub-template 260 to provide, subsequent to etching, the template 100 including a superimposed pattern 102, wherein the superimposed pattern 102 is characteristic of the superimposition of the second pattern 252 on the first pattern 262. As provided herein, superimposition of the second pattern 252 on the first pattern 262 creates, subsequent to etching, circumferentially aligned protrusions of optionally different dimensions across the template 100.

FIG. 2C provides a non-limiting example of template fabrication for a patterned recording medium including servo patterns patterned therein. In a first part of a first step, a first pattern 252 of relatively high resolution may be created on a substrate 200 in a to-be-patterned area 202 to provide a sub-template 250 including the first pattern 252. In a second part of a first step, a second pattern 262 of relatively high resolution in nascent data sectors and relatively low resolution in nascent servo sectors may be created on a different substrate 200 in a to-be-patterned area 202 to provide a sub-template 260 including the second pattern 262. In a second step, the first pattern 252 and the second pattern 262 may be superimposed on yet a different substrate 200 in a to-be-patterned area 202 to provide, subsequent to etching, the template 100 including a superimposed pattern 102 by cross imprinting (e.g., cross imprinting via nanoimprint lithography ["NIL"]) the sub-template 250 and the sub-template 260. As provided herein, superimposition of the first pattern 252 and the second pattern 262 creates, subsequent to etching, circumferentially aligned protrusions of optionally different dimensions across the template 100.

While not shown in FIGS. 2A, 2B, and 2C, the template 100 may be subsequently used to fabricate patterned recording media such as BPM (e.g., rectangular BPM) by NIL. Accordingly, the circumferentially aligned protrusions across the template 100 correspond to magnetic features across data sectors and servo sectors of subsequently fabricated patterned recording media, which provides self-registration of tracks across the data sectors and the servo sectors obviating any discovery process, unless desired.

The pattern 252 provided in reference to FIG. 2A (e.g., the first pattern 252), FIG. 2B (e.g., the second pattern 252), and FIG. 2C (e.g., the first pattern 252) may include circumferential lines of relatively high resolution traversing nascent data sectors and nascent servo sectors as illustrated in FIGS. 2A and 2C. However, only a portion of the pattern 252 is illustrated in FIGS. 2A and 2C. It should be understood that the pattern 252 may extend from an inner diameter of the sub-template 250 to an outer diameter of the sub-template 250 in accordance with data sectors and servo sectors of patterned recording media to which the template 100 corresponds.

The circumferential lines of the pattern 252 of FIGS. 2A and 2C may be of a width and pitch to provide the template 100 with protrusions dimensioned as provided herein. Indeed, different sub-templates (e.g., 250$a$, 250$b$, 250$c$, . . . , 250$n$, wherein n indicates the $n^{th}$ sub-template), each including circumferential lines with a different width and pitch, may be used to control the dimensions of the protrusions in the template 100, and, ultimately, the BAR of magnetic features in corresponding patterned recording media. Such control is favorable for simultaneously optimizing different designs for fabrication of read-write heads for recording devices and fabrication of templates.

Any of a number of methods may be used to fabricate the circumferential lines of the pattern 252 of FIGS. 2A and 2C, including, but not limited to, electron-beam lithography, interference lithography, photolithography, imprint lithography, or a combination thereof, optionally in combination with block copolymer DSA, multiple patterning (e.g., double patterning), or a combination thereof. In some embodiments, for example, the circumferential lines may be fabricated using electron-beam lithography to establish a chemical pre-pattern (e.g., a binary pattern of regions with different wettability) or topographical pre-pattern in combination with cylinder-forming or lamella-forming block copolymer DSA.

The pattern 262 provided in reference to FIG. 2A (e.g., the second pattern 262), FIG. 2B (e.g., the first pattern 262), and FIG. 2C (e.g., the second pattern 262) may include radial lines of relatively high resolution traversing nascent data sectors and wider radial lines (also with larger pitch) and chevrons of relatively low resolution traversing nascent servo sectors as illustrated in FIGS. 2B and 2C. However, only a portion of the pattern 262 is illustrated in FIGS. 2B and 2C. It should be understood that the pattern 262 may annularly extend around the sub-template 260 in accordance with data sectors and servo sectors of patterned recording media to which the template 100 corresponds.

The radial lines and the chevrons of the pattern 262 of FIGS. 2B and 2C may be of a width and pitch to provide the template 100 with protrusions dimensioned as provided herein. Indeed, different sub-templates (e.g., 260a, 260b, 260c, . . . , 260n, wherein n indicates the $n^{th}$ sub-template), each including radial lines and chevrons with a different width and pitch, may be used to control the dimensions of the protrusions in the template 100, and, ultimately, the BAR of magnetic features in corresponding patterned recording media. Such control is favorable for simultaneously optimizing different designs for fabrication of read-write heads for recording devices and fabrication of templates.

Any of a number of methods may be used to fabricate the radial lines and the chevrons of the pattern 262 of FIGS. 2B and 2C, including, but not limited to, electron-beam lithography, interference lithography, photolithography, imprint lithography, or a combination thereof, optionally in combination with block copolymer DSA, multiple patterning (e.g., double patterning), or a combination thereof. In some embodiments, for example, the radial lines of relatively high resolution may be fabricated using electron-beam lithography to establish a chemical pre-pattern (e.g., a binary pattern of regions with different wettability) or topographical pre-pattern in combination with cylinder-forming or lamella-forming block copolymer DSA. In some embodiments, for example, the wider radial lines and chevrons of relatively low resolution may be fabricated using electron-beam lithography.

Radially Aligned, Servo-Related Features

FIG. 3A provides a non-limiting example of a template 300 corresponding to a patterned recording medium including servo patterns patterned therein. The template 300 may include a template (e.g., microimprint template, nanoimprint template, etc.) for any recording medium or recording media to which lithographic (e.g., microlithographic, nanolithographic, etc.) patterning may be applied or extended. As such, the template 300 may include, but is not limited to, a template for LMR media, a template for PMR media, a template for HAMR media, a template for DTR media, or a template for BPM. In some embodiments, for example, the template 300 may include a template for BPM such as rectangular BPM. It should be understood that the template 300 of FIG. 3A is a schematic provided to aid understanding. As such, the template 300 of FIG. 3A is illustrated without certain features such as features corresponding to zones for zoned bit recording in a patterned recording medium.

The template 300 of FIG. 3A may include a servo scheme 310 patterned therein corresponding to a servo scheme of a patterned recording medium. The servo patterns of the servo scheme 310 may be part of any servo scheme. As such, the servo scheme 310 may include, but is not limited to, a wedge servo scheme, an embedded servo scheme, or a dedicated servo scheme. In some embodiments, for example, the servo patterns may be part of an embedded servo scheme such as the embedded servo scheme 310 of FIG. 3A. Because the template 300 of FIG. 3A is a schematic without certain features such as features corresponding to zones for zoned bit recording in a patterned recording medium, it should also be understood that the servo scheme 310 is not limited to the layout of FIG. 3A. The servo scheme 310 of FIG. 3A, or any other servo scheme for a patterned recording medium, including, but not limited to the foregoing, may have a layout in accordance with zone bit recording.

The template 300 of FIG. 3A may include servo regions or servo sectors 320 alternately arranged with data regions or data sectors 330 patterned therein corresponding to a patterned recording medium. The servo sectors 320 may include any servo sector fields necessary to support servo functions of a recording device in which a patterned recording medium corresponding to the template 300 is used. As such, the servo sector fields may include, but are not limited to, one or more servo sector fields selected from a sync field including a PLL field or an iPLL field, an AGC field, and/or a preamble field; a SAM field or SIM field; a Gray-coded track identification field; and a PES burst pattern field. In some embodiments, for example, the servo sectors 320 may include the PES burst pattern field of FIG. 3A, which PES burst pattern field is provided as the PES burst pattern field 322 of FIG. 3B. In some embodiments, for example, the servo sectors 320 may include the SAM field of FIG. 3A, which SAM field is provided as the SAM field 324 of FIG. 3B.

It should be understood that the servo sector fields including related fields necessary to support servo functions of a recording device in which a corresponding patterned recording medium is used need not be limited to the servo sectors 320. In some embodiments, for example, the data sectors 330 may include the PLL or iPLL fields of FIG. 3A, one of which PLL or iPLL fields is provided as the iPLL field 334 of FIG. 3B.

FIG. 3B provides a non-limiting example of a pattern 302 (or portion thereof) of the template 300 of FIG. 3A corresponding to a pattern (or portion thereof) of a patterned recording medium including servo sectors 320 patterned therein. While the servo sectors 320 may include any recording device-necessitated servo sector fields, a PES burst pattern field 322 and a SAM field 324 are illustrated in FIG. 3B as an example. The PES burst pattern field 322 may include any of a number of patterned features, including, but not limited to, patterned chevrons (e.g., pre-patterned chevrons patterned with a number of radial lines therein or thereon), two of which are illustrated in FIG. 3B. The patterned chevrons may include any of a number of different protrusions, including, but not limited to, the rhomboidal protrusions illustrated in a cross-track 342 of FIG. 3B. The SAM field 324 may include any of a number of patterned features, including, but not limited to, patterned radial lines (e.g., pre-patterned radial lines patterned with a number of radial lines therein or thereon), six of which are illustrated in FIG. 3B. The patterned radial lines may include any of a number of different protrusions, including, but not limited to, linear protrusions such as the linear protrusion illustrated in a cross-track 344 of FIG. 3B.

The protrusions of a servo sector and/or the one or more servo sector fields thereof may be radially aligned in accordance with one or more methods of fabrication provided herein. For example, the cross-track 342 of FIG. 3B includes rhomboidal protrusions in the PES burst pattern field 322, and the cross-track 344 of FIG. 3B includes a linear protrusion in the SAM field 324, which protrusions may be radially aligned along their respective cross-tracks.

The protrusions of a servo sector may be dimensioned in accordance with the protrusions of a servo sector provided in reference to FIG. 1B.

FIG. 3B provides a non-limiting example of a pattern 302 (or portion thereof) of the template 300 of FIG. 3A corresponding to a pattern (or portion thereof) of a patterned recording medium including data sectors 330 patterned therein. While the data sectors 330 may include any recording device-necessitated data fields and optional intervening servo sector fields, a data field 332 and an iPLL field 334 are illustrated in FIG. 3B as an example. Each of the data field 332 and the iPLL field 334 may individually include any of a number of patterned features, including, but not limited to, patterned radial lines (e.g., pre-patterned radial lines patterned with a number of radial lines therein or thereon) and/or patterned circumferential lines (e.g., pre-patterned circumferential lines patterned with a number of circumferential lines therein or thereon). As such, each of the data field 332 and the iPLL field 334 may individually include any arrangement of protrusions, including, but not limited to, a rectangular array (or pseudo-rectangular array) of protrusions consistent with magnetic features of a rectangular BPM as illustrated in FIG. 3B. The rectangular array of protrusions may include any of a number of different protrusions, including, but not limited to, rectangular protrusions, which include square protrusions. For example, a cross-track 346 in the data field 332 of FIG. 3B includes a number of such rectangular protrusions, one for each patterned circumferential line in the rectangular array of protrusions. For example, a cross-track 348 in the iPLL field 334 of FIG. 3B includes a number of such rectangular protrusions, one for each patterned circumferential line in the rectangular array of protrusions.

The protrusions of a data sector may be radially (and circumferentially) aligned in accordance with one or more methods of fabrication provided herein. For example, the cross-track 346 of FIG. 3B includes rectangular protrusions, all of which protrusions are radially aligned along the cross-track 346. For example, the cross-track 348 of FIG. 3B includes rectangular protrusions, all of which protrusions are radially aligned along the cross-track 348.

The protrusions of a data sector may be dimensioned in accordance with the protrusions of a data sector provided in reference to FIG. 1B.

A data sector may be regular with respect to the pattern of protrusions. For example, the rectangular array of protrusions in the data field 332 of FIG. 3B has regularly repeating rectangular protrusions in each of the cross-track and down-track directions. Comparatively, a servo sector may be irregular with respect to the pattern of protrusions, which may include, but is not limited to, different protrusions within a servo sector field, different protrusions in a cross-track direction, and/or different protrusions in a down-track direction. With respect to different protrusions in a down-track direction, for example, the protrusions in an arbitrary track of FIG. 3B may include rhomboidal protrusions of the PES burst pattern field 322 and linear protrusions of the SAM field 324.

A data sector may be dense with respect to the number of protrusions per unit area and/or the total surface area of protrusions per unit area. Comparatively, a servo sector may be sparse with respect to the number of protrusions per unit area and/or the total surface area of protrusions per unit area. For example, the number of protrusions in the data sector 330 of FIG. 3B is greater than the number of protrusions in the servo sector 320 for about the same unit area.

In accordance with one or more methods of fabrication provided herein, a data sector and/or the protrusions therein may be radially (and circumferentially) aligned within the data sector, and a servo sector and/or the protrusions therein may be radially aligned within the servo sector. For example, the cross-track 342 of FIG. 3B includes rhomboidal protrusions in the PES burst pattern field 322, which may be radially aligned along the cross-track 342. For example, the cross-track 344 of FIG. 3B includes a linear protrusion in the SAM field 324, which may be radially aligned along the cross-track 344. For example, the cross-track 346 of FIG. 3B includes rectangular protrusions in the data field 332, which may be radially aligned along the cross-track 346 (and circumferentially aligned along an arbitrary track). For example, the cross-track 348 of FIG. 3B includes rectangular protrusions in the iPLL field 334, which may be radially aligned along the cross-track 348 (and circumferentially aligned along an arbitrary track).

FIG. 4A provides a non-limiting example of template fabrication for a patterned recording medium including servo patterns patterned therein. In a first step, a first pattern 452 of relatively high resolution may be created on a substrate 200 in a to-be-patterned area 202 to provide a sub-template 450 including the first pattern 452. In a second step, a second pattern 462 (see FIG. 4B) of relatively high resolution in nascent data sectors and relatively low resolution in nascent servo sectors may be superimposed on the sub-template 450 to provide, subsequent to etching, the template 300 including a superimposed pattern 302, wherein the superimposed pattern 302 is characteristic of the superimposition of the second pattern 462 on the first pattern 452. As provided herein, superimposition of the second pattern 462 on the first pattern 452 creates, subsequent to etching, radially aligned protrusions of optionally different dimensions across the template 300.

FIG. 4B provides a non-limiting example of template fabrication for a patterned recording medium including servo patterns patterned therein. In a first step, a first pattern 462 of relatively high resolution in nascent data sectors and relatively low resolution in nascent servo sectors may be created on a substrate 200 in a to-be-patterned area 202 to provide a sub-template 460 including the first pattern 462. In a second step, a second pattern 452 (see FIG. 4A) of relatively high resolution may be superimposed on the sub-template 460 to provide, subsequent to etching, the template 300 including a superimposed pattern 302, wherein the superimposed pattern 302 is characteristic of the superimposition of the second pattern 452 on the first pattern 462. As provided herein, superimposition of the second pattern 452 on the first pattern 462 creates, subsequent to etching, radially aligned protrusions of optionally different dimensions across the template 300.

FIG. 4C provides a non-limiting example of template fabrication for a patterned recording medium including servo patterns patterned therein. In a first part of a first step, a first pattern 452 of relatively high resolution may be created on a substrate 200 in a to-be-patterned area 202 to provide a sub-template 450 including the first pattern 452. In a second part of a first step, a second pattern 462 of relatively high resolution in nascent data sectors and relatively low resolution in nascent servo sectors may be created on a different substrate 200 in a to-be-patterned area 202 to provide a sub-template 460 including the second pattern 462. In a second step, the first pattern 452 and the second pattern 462 may be superimposed on yet a different substrate 200 in a to-be-patterned area 202 to provide, subsequent to etching, the template 300 including a superimposed pattern 302 by cross imprinting (e.g., cross imprinting via NIL) the sub-template 450 and the sub-template 460. As provided herein, superimposition of the first pattern 452 and the second pattern 462 creates, subsequent to etching, radially aligned protrusions of optionally different dimensions across the template 300.

While not shown in FIGS. 4A, 4B, and 4C, the template 300 may be subsequently used to fabricate patterned recording media such as BPM (e.g., rectangular BPM) by NIL. Accordingly, the radially aligned protrusions across the template 300 correspond to magnetic features across data sectors and servo sectors of subsequently fabricated patterned recording media, which provides self-registration across the data sectors and the servo sectors obviating any discovery process, unless desired.

The pattern 452 provided in reference to FIG. 4A (e.g., the first pattern 452), FIG. 4B (e.g., the second pattern 452), and FIG. 4C (e.g., the first pattern 452) may include radial lines of relatively high resolution traversing nascent data sectors and nascent servo sectors as illustrated in FIGS. 4A and 4C. However, only a portion of the pattern 452 is illustrated in FIGS. 4A and 4C. It should be understood that the pattern 452 may annularly extend around the sub-template 450 in accordance with data sectors and servo sectors of patterned recording media to which the template 300 corresponds.

The radial lines of the pattern 452 of FIGS. 4A and 4C may be of a width and pitch to provide the template 300 with protrusions dimensioned as provided herein. Indeed, different sub-templates (e.g., 450a, 450b, 450c, . . . , 450n, wherein n indicates the $n^{th}$ sub-template), each including radial lines with a different width and pitch, may be used to control the dimensions of the protrusions in the template 300, and, ultimately, the BAR of magnetic features in corresponding patterned recording media. Such control is favorable for simultaneously optimizing different designs for fabrication of read-write heads for recording devices and fabrication of templates.

Any of a number of methods may be used to fabricate the radial lines of the pattern 452 of FIGS. 4A and 4C, including, but not limited to, electron-beam lithography, interference lithography, photolithography, imprint lithography, or a combination thereof, optionally in combination with block copolymer DSA, multiple patterning (e.g., double patterning), or a combination thereof. In some embodiments, for example, the radial lines may be fabricated using electron-beam lithography to establish a chemical pre-pattern (e.g., a binary pattern of regions with different wettability) or topographical pre-pattern in combination with block copolymer DSA thereon.

FIG. 5A provides a non-limiting example of a method (or portion thereof) to fabricate the radial lines of the pattern 452 of FIGS. 4A and 4C. In a first step, a first pattern 572 including a topographical pre-pattern of relatively low-resolution guiding features (e.g., radial lines) may be formed (e.g., electron-beam lithography, interference lithography, photolithography, imprint lithography, etc.) in resist on a substrate. The first pattern 572 may include nascent servo sectors 520 corresponding to servo sectors of a patterned recording medium, each of which servo sectors may include a nascent PES burst pattern field 522, a nascent SAM field 524, or a number of the foregoing fields in combination. The first pattern 572 may also include nascent data sectors 530 corresponding to data sectors of a patterned recording medium, each of which data sectors may include a nascent data field 532, a nascent iPLL field 534, or a number of the foregoing fields in combination. In a second step, the second pattern 452 including nanolines or relatively high-resolution lines of a block copolymer parallel to the guiding features of the topographical pre-pattern may be formed by block copolymer DSA, wherein the block copolymer includes, but is not limited to, a cylinder-forming block copolymer (lying down) or a lamella-forming block copolymer (standing up). In a third step, the second pattern 452 may be transferred to a substrate to form the sub-template 450, optionally by a standard tone or reverse tone etching process.

FIG. 5B provides a cross-sectional view of forming the relatively high-resolution lines of the block copolymer parallel to the relatively low-resolution guiding features of the topographical pre-pattern. As provided in FIG. 5A, the cross-sectional views of the first pattern 572 and the second pattern 452 of FIG. 5B correspond to a nascent iPLL field 534 (or portion thereof).

FIG. 5C provides an image of an example of relatively high-resolution radial lines of a block copolymer, which radial lines were formed parallel to relatively low-resolution guiding features of a topographical pre-pattern. The example used a block copolymer with a natural period $L_0$ of 16 nm to form the high-resolution radial lines of the block copolymer corresponding to a nascent data field 532 and a nascent iPLL field 534.

The pattern 462 provided in reference to FIG. 4A (e.g., the second pattern 462), FIG. 4B (e.g., the first pattern 462), and FIG. 4C (e.g., the second pattern 462) may include circumferential lines of relatively high resolution traversing nascent data sectors, and radial lines and chevrons of relatively low resolution traversing nascent servo sectors as illustrated in FIGS. 4B and 4C. However, only a portion of the pattern 462 is illustrated in FIGS. 4B and 4C. It should be understood that the pattern 462 may extend from an inner diameter of the sub-template 460 to an outer diameter of the sub-template 460 in accordance with data sectors and servo sectors of patterned recording media to which the template 300 corresponds.

The circumferential lines, the radial lines, and the chevrons of the pattern 462 of FIGS. 4B and 4C may be of a width and pitch to provide the template 300 with protrusions dimensioned as provided herein. Indeed, different sub-templates (e.g., 460a, 460b, 460c, . . . , 460n, wherein n indicates the $n^{th}$ sub-template), each including circumferential lines, radial lines, and chevrons with a different width and pitch, may be used to control the dimensions of the protrusions in the template 300, and, ultimately, the BAR of magnetic features in corresponding patterned recording media. Such control is favorable for simultaneously optimizing different designs for fabrication of read-write heads for recording devices and fabrication of templates.

Any of a number of methods may be used to fabricate the circumferential lines, the radial lines, and the chevrons of the pattern 462 of FIGS. 4B and 4C, including, but not limited to, electron-beam lithography, interference lithography, photolithography, imprint lithography, or a combination thereof, optionally in combination with block copolymer DSA, multiple patterning (e.g., double patterning), or a combination thereof. In some embodiments, for example, the circumferential lines of relatively high resolution may be fabricated using electron-beam lithography to establish a chemical pre-pattern (e.g., a binary pattern of regions with different wettability) or topographical pre-pattern in combination with block copolymer DSA thereon. In some embodiments, for example, the radial lines and chevrons of relatively low resolution may be fabricated using electron-beam lithography. For example, the method (or portion thereof) provided in reference to FIGS. 8A-8D, 11A, and 11B may be used to fabricate the circumferential lines, the radial lines, and/or the chevrons of the pattern 462 of FIGS. 4A and 4C.

FIG. 6A provides a non-limiting example of a template 600 corresponding to a patterned recording medium including servo patterns patterned therein. The template 600 may include a template (e.g., microimprint template, nanoimprint template, etc.) for any recording medium or recording media to which lithographic (e.g., microlithographic, nanolithographic, etc.) patterning may be applied or extended. As such, the template 600 may include, but is not limited to, a template for LMR media, a template for PMR media, a template for HAMR media, a template for DTR media, or a template for BPM. In some embodiments, for example, the template 600 may include a template for BPM such as rectangular BPM. It should be understood that the template 600 of FIG. 6A is a schematic provided to aid understanding. As such, the template 600 of FIG. 6A is illustrated without certain features such as features corresponding to zones for zoned bit recording in a patterned recording medium.

The template 600 of FIG. 6A may include a servo scheme 610 patterned therein corresponding to a servo scheme of a patterned recording medium. The servo patterns of the servo scheme 610 may be part of any servo scheme. As such, the servo scheme 610 may include, but is not limited to, a wedge servo scheme, an embedded servo scheme, or a dedicated servo scheme. In some embodiments, for example, the servo patterns may be part of an embedded servo scheme such as the embedded servo scheme 610 of FIG. 6A. Because the template 600 of FIG. 6A is a schematic without certain features such as features corresponding to zones for zoned bit recording in a patterned recording medium, it should also be understood that the servo scheme 610 is not limited to the layout of FIG. 6A. The servo scheme 610 of FIG. 6A, or any other servo scheme for a patterned recording medium, including, but not limited to the foregoing, may have a layout in accordance with zone bit recording.

The template 600 of FIG. 6A may include servo regions or servo sectors 620 alternately arranged with data regions or data sectors 630 patterned therein corresponding to a patterned recording medium. The servo sectors 620 may include any servo sector fields necessary to support servo functions of a recording device in which a patterned recording medium corresponding to the template 600 is used. As such, the servo sector fields may include, but are not limited to, one or more servo sector fields selected from a sync field including a PLL field or an iPLL field, an AGC field, and/or a preamble field; a SAM field or SIM field; a Gray-coded track identification field; and a PES burst pattern field. In some embodiments, for example, the servo sectors 620 may include the PES burst pattern field of FIG. 6A, which PES burst pattern field is provided as the PES burst pattern field 622 of FIG. 6B. In some embodiments, for example, the servo sectors 620 may include the SAM field of FIG. 6A, which SAM field is provided as the SAM field 624 of FIG. 6B.

It should be understood that the servo sector fields including related fields necessary to support servo functions of a recording device in which a corresponding patterned recording medium is used need not be limited to the servo sectors 620. In some embodiments, for example, the data sectors 630 may include the PLL or iPLL fields of FIG. 6A, one of which PLL or iPLL fields is provided as the iPLL field 634 of FIG. 6B.

FIG. 6B provides a non-limiting example of a pattern 602 (or portion thereof) of the template 600 of FIG. 6A corresponding to a pattern (or portion thereof) of a patterned recording medium including servo sectors 620 patterned therein. While the servo sectors 620 may include any recording device-necessitated servo sector fields, a PES burst pattern field 622 and a SAM field 624 are illustrated in FIG. 6B as an example. The PES burst pattern field 622 may include any of a number of patterned features, including, but not limited to, patterned chevrons (e.g., pre-patterned chevrons patterned with a number of radial lines therein or thereon), two of which are illustrated in FIG. 6B. The patterned chevrons may include any of a number of different protrusions, including, but not limited to, the rhomboidal protrusions illustrated in a cross-track 642 of FIG. 6B. The SAM field 624 may include any of a number of patterned features, including, but not limited to, patterned radial lines (e.g., pre-patterned radial lines patterned with a number of radial lines therein or thereon), four of which are illustrated in FIG. 6B. The patterned radial lines may include any of a number of different protrusions, including, but not limited to, linear protrusions such as the linear protrusion illustrated in a cross-track 644 of FIG. 6B.

The protrusions of a servo sector and/or the one or more servo sector fields thereof may be radially aligned in accordance with one or more methods of fabrication provided herein. For example, the cross-track 642 of FIG. 6B includes rhomboidal protrusions in the PES burst pattern field 622, and the cross-track 644 of FIG. 6B includes a linear protrusion in the SAM field 624, which protrusions may be radially aligned along their respective cross-tracks.

The protrusions of a servo sector may be dimensioned in accordance with the protrusions of a servo sector provided in reference to FIG. 1B.

FIG. 6B provides a non-limiting example of a pattern 602 (or portion thereof) of the template 600 of FIG. 6A corresponding to a pattern (or portion thereof) of a patterned recording medium including data sectors 630 patterned therein. While the data sectors 630 may include any recording device-necessitated data fields and optional intervening servo sector fields, a data field 632 and an iPLL field 634 are illustrated in FIG. 6B as an example. Each of the data field 632 and the iPLL field 634 may individually include any of a number of patterned features, including, but not limited to, patterned radial lines (e.g., pre-patterned radial lines patterned with a number of radial lines therein or thereon) and/or patterned circumferential lines (e.g., pre-patterned circumferential lines patterned with a number of circumferential lines therein or thereon). As such, each of the data field 632 and the iPLL field 634 may individually include any arrangement of protrusions, including, but not limited to, a rectangular array (or pseudo-rectangular array) of protrusions consistent with magnetic features of a rectangular BPM as illustrated in FIG. 6B. The rectangular array of protrusions may include any of a number of different protrusions, including, but not limited to, rectangular protrusions, which include square protrusions. For example, a cross-track 646 in the data field 632 of FIG. 6B includes a number of such rectangular protrusions, one for each patterned circumferential line in the rectangular array of protrusions. For example, a cross-track 648 in the iPLL field 634 of FIG. 6B includes a number of such rectangular protrusions, one for each patterned circumferential line in the rectangular array of protrusions.

The protrusions of a data sector may be radially (and circumferentially) aligned in accordance with one or more methods of fabrication provided herein. For example, the cross-track 646 of FIG. 6B includes rectangular protrusions, all of which protrusions are radially aligned along the cross-track 646. For example, the cross-track 648 of FIG. 6B includes rectangular protrusions, all of which protrusions are radially aligned along the cross-track 648.

The protrusions of a data sector may be dimensioned in accordance with the protrusions of a data sector provided in reference to FIG. 1B.

A data sector may be regular with respect to the pattern of protrusions. For example, the rectangular array of protrusions in the data field 632 of FIG. 6B has regularly repeating rectangular protrusions in each of the cross-track and down-track directions. Comparatively, a servo sector may be irregular with respect to the pattern of protrusions, which may include, but is not limited to, different protrusions within a servo sector field, different protrusions in a cross-track direction, and/or different protrusions in a down-track direction. With respect to different protrusions in a down-track direction, for example, the protrusions in an arbitrary track of FIG. 6B may include rhomboidal protrusions of the PES burst pattern field 622 and linear protrusions of the SAM field 624.

A data sector may be dense with respect to the number of protrusions per unit area and/or the total surface area of protrusions per unit area. Comparatively, a servo sector may be sparse with respect to the number of protrusions per unit area and/or the total surface area of protrusions per unit area. For example, the number of protrusions in the data sector 630 of FIG. 6B is greater than the number of protrusions in the servo sector 620 for about the same unit area.

In accordance with one or more methods of fabrication provided herein, a data sector and/or the protrusions therein may be radially (and circumferentially) aligned within the data sector, and a servo sector and/or the protrusions therein may be radially aligned within the servo sector. For example, the cross-track 642 of FIG. 6B includes rhomboidal protrusions in the PES burst pattern field 622, which may be radially aligned along the cross-track 642. For example, the cross-track 644 of FIG. 6B includes a linear protrusion in the SAM field 624, which may be radially aligned along the cross-track 644. For example, the cross-track 646 of FIG. 6B includes rectangular protrusions in the data field 632, which may be radially aligned along the cross-track 646 (and circumferentially aligned along an arbitrary track). For example, the cross-track 648 of FIG. 6B includes rectangular protrusions in the iPLL field 634, which may be radially aligned along the cross-track 648 (and circumferentially aligned along an arbitrary track).

FIG. 7A provides a non-limiting example of template fabrication for a patterned recording medium including servo patterns patterned therein. In a first step, a first pattern 452 may be created on a substrate 200 in a to-be-patterned area 202 to provide a sub-template 450 including the first pattern 452. In a second step, a second pattern 762 (see FIG. 7B) may be superimposed on the sub-template 450 to provide, subsequent to etching, the template 600 including a superimposed pattern 602, wherein the superimposed pattern 602 is characteristic of the superimposition of the second pattern 762 on the first pattern 452. As provided herein, superimposition of the second pattern 762 on the first pattern 452 creates, subsequent to etching, radially aligned protrusions of optionally different dimensions across the template 600.

FIG. 7B provides a non-limiting example of template fabrication for a patterned recording medium including servo patterns patterned therein. In a first step, a first pattern 762 may be created on a substrate 200 in a to-be-patterned area 202 to provide a sub-template 760 including the first pattern 762. In a second step, a second pattern 452 (see FIG. 7A) may be superimposed on the sub-template 760 to provide, subsequent to etching, the template 600 including a superimposed pattern 602, wherein the superimposed pattern 602 is characteristic of the superimposition of the second pattern 452 on the first pattern 762. As provided herein, superimposition of the second pattern 452 on the first pattern 762 creates, subsequent to etching, radially aligned protrusions of optionally different dimensions across the template 600.

FIG. 7C provides a non-limiting example of template fabrication for a patterned recording medium including servo patterns patterned therein. In a first part of a first step, a first pattern 452 may be created on a substrate 200 in a to-be-patterned area 202 to provide a sub-template 450 including the first pattern 452. In a second part of a first step, a second pattern 762 may be created on a different substrate 200 in a to-be-patterned area 202 to provide a sub-template 760 including the second pattern 762. In a second step, the first pattern 452 and the second pattern 762 may be superimposed on yet a different substrate 200 in a to-be-patterned area 202 to provide, subsequent to etching, the template 600 including a superimposed pattern 602 by cross imprinting (e.g., cross imprinting via NIL) the sub-template 450 and the sub-template 760. As provided herein, superimposition of the first pattern 452 and the second pattern 762 creates, subsequent to etching, radially aligned protrusions of optionally different dimensions across the template 600.

While not shown in FIGS. 7A, 7B, and 7C, the template 600 may be subsequently used to fabricate patterned recording media such as BPM (e.g., rectangular BPM) by NIL. Accordingly, the radially aligned protrusions across the template 600 correspond to magnetic features across data sectors and servo sectors of subsequently fabricated patterned recording media, which provides self-registration across the data sectors and the servo sectors obviating any discovery process, unless desired.

The pattern 452 provided in reference to FIG. 7A (e.g., the first pattern 452), FIG. 7B (e.g., the second pattern 452), and FIG. 7C (e.g., the first pattern 452) may include radial lines of relatively high resolution traversing nascent data sectors and nascent servo sectors as illustrated in FIGS. 7A and 7C. However, only a portion of the pattern 452 is illustrated in FIGS. 7A and 7C. It should be understood that the pattern 452 may annularly extend around the sub-template 450 in accordance with data sectors and servo sectors of patterned recording media to which the template 600 corresponds.

The radial lines of the pattern 452 of FIGS. 7A and 7C may be of a width and pitch to provide the template 600 with protrusions dimensioned as provided herein. Indeed, different sub-templates (e.g., 450a, 450b, 450c, . . . , 450n, wherein n indicates the $n^{th}$ sub-template), each including radial lines with a different width and pitch, may be used to control the dimensions of the protrusions in the template 600, and, ultimately, the BAR of magnetic features in corresponding patterned recording media. Such control is favorable for simultaneously optimizing different designs for fabrication of read-write heads for recording devices and fabrication of templates.

Any of a number of methods may be used to fabricate the radial lines of the pattern 452 of FIGS. 7A and 7C, including, but not limited to, electron-beam lithography, interference lithography, photolithography, imprint lithography, or a combination thereof, optionally in combination with block copolymer DSA, multiple patterning (e.g., double patterning), or a combination thereof. In some embodiments, for example, the radial lines may be fabricated using electron-beam lithography to establish a chemical pre-pattern (e.g., a binary pattern of regions with different wettability) or topographical pre-pattern in combination with block copolymer DSA thereon. For example, the method (or portion thereof) provided in reference to FIGS. 5A-5C may be used to fabricate the radial lines of the pattern 452 of FIGS. 7A and 7C.

The pattern 762 provided in reference to FIG. 7A (e.g., the second pattern 762), FIG. 7B (e.g., the first pattern 762), and FIG. 7C (e.g., the second pattern 762) may include circumferential lines of relatively high resolution traversing nascent data sectors, and radial lines and chevrons of relatively high resolution traversing nascent servo sectors as illustrated in FIGS. 7B and 7C. However, only a portion of the pattern 762 is illustrated in FIGS. 7B and 7C. It should be understood that the pattern 762 may extend from an inner diameter of the sub-template 760 to an outer diameter of the sub-template 760 in accordance with data sectors and servo sectors of patterned recording media to which the template 600 corresponds.

The circumferential lines, the radial lines, and the chevrons of the pattern 762 of FIGS. 7B and 7C may be of a width and pitch to provide the template 600 with protrusions dimensioned as provided herein. Indeed, different sub-templates (e.g., 760a, 760b, 760c, . . . , 760n, wherein n indicates the $n^{th}$ sub-template), each including circumferential lines, radial lines, and chevrons with a different width and pitch, may be used to control the dimensions of the protrusions in the template 600, and, ultimately, the BAR of magnetic features in corresponding patterned recording media. Such control is favorable for simultaneously optimizing different designs for fabrication of read-write heads for recording devices and fabrication of templates.

Any of a number of methods may be used to fabricate the circumferential lines, the radial lines, and the chevrons of the pattern 762 of FIGS. 7B and 7C, including, but not limited to, electron-beam lithography, interference lithography, photolithography, imprint lithography, or a combination thereof, optionally in combination with block copolymer DSA, multiple patterning (e.g., double patterning), or a combination thereof. In some embodiments, for example, the circumferential lines of relatively high resolution may be fabricated using electron-beam lithography to establish a chemical pre-pattern (e.g., a binary pattern of regions with different wettability) or topographical pre-pattern in combination with block copolymer DSA thereon. In some embodiments, for example, the radial lines and chevrons of relatively high resolution may be fabricated using electron-beam lithography to establish a chemical pre-pattern (e.g., a binary pattern of regions with different wettability) or topographical pre-pattern in combination with block copolymer DSA thereon.

FIG. 8A provides a non-limiting example of a method (or portion thereof) to fabricate the circumferential lines, the radial lines, and the chevrons of the pattern 762 of FIGS. 7B and 7C. In a first step, a first pattern 872 including a topographical pre-pattern of relatively low-resolution guiding features (e.g., circumferential lines, radial lines, chevrons) may be formed (e.g., electron-beam lithography, interference lithography, photolithography, imprint lithography, etc.) in resist on a substrate. The first pattern 872 may include nascent servo sectors 820 corresponding to servo sectors of a patterned recording medium, each of which servo sectors may include a nascent PES burst pattern field 822, a nascent SAM field 824, or a number of the foregoing fields in combination. The first pattern 872 may also include nascent data sectors 830 corresponding to data sectors of a patterned recording medium, each of which data sectors may include a nascent data field 832, a nascent iPLL field 834, or a number of the foregoing fields in combination. In a second step, the second pattern 762 including nanolines or relatively high-resolution lines of a block copolymer parallel to the guiding features of the topographical pre-pattern may be formed by block copolymer DSA, wherein the block copolymer includes, but is not limited to, a cylinder-forming block copolymer (lying down) or a lamella-forming block copolymer (standing up). In a third step, the second pattern 762 may be transferred to a substrate to form the sub-template 760, optionally by a standard tone or reverse tone etching process.

FIG. 8B provides an image of an example of relatively high-resolution lines of a block copolymer, which lines were formed parallel to relatively low-resolution guiding features of a topographical pre-pattern. The example used a block copolymer with a natural period $L_0$ of 16.5 nm to form high-resolution lines of the block copolymer corresponding to a nascent PES burst pattern field 822, a nascent SAM field 824, and a nascent data field 832.

FIG. 8C provides an image of an example of relatively high-resolution lines of a block copolymer, which lines were formed parallel to relatively low-resolution guiding features of a topographical pre-pattern. The example used a block copolymer with a natural period $L_0$ of 22.5 nm to form high-resolution lines of the block copolymer corresponding to a nascent PES burst pattern field 822 and a nascent SAM field 824.

FIG. 8D provides an image of an example of relatively high-resolution lines of a block copolymer, which lines were formed parallel to relatively low-resolution guiding features of a topographical pre-pattern. The example used a block copolymer with a natural period $L_0$ of 25 nm to form high-resolution lines of the block copolymer corresponding to a nascent PES burst pattern field 822, a nascent SAM field 824, and a nascent data field 832.

FIG. 9A provides a non-limiting example of a template 900 corresponding to a patterned recording medium including servo patterns patterned therein. The template 900 may include a template (e.g., microimprint template, nanoimprint template, etc.) for any recording medium or recording media to which lithographic (e.g., microlithographic, nanolithographic, etc.) patterning may be applied or extended. As such, the template 900 may include, but is not limited to, a template for LMR media, a template for PMR media, a template for HAMR media, a template for DTR media, or a template for BPM. In some embodiments, for example, the template 900 may include a template for BPM such as rectangular BPM. It should be understood that the template 900 of FIG. 9A is a schematic provided to aid understanding. As such, the template 900 of FIG. 9A is illustrated without certain features such as features corresponding to zones for zoned bit recording in a patterned recording medium.

The template 900 of FIG. 9A may include a servo scheme 910 patterned therein corresponding to a servo scheme of a patterned recording medium. The servo patterns of the servo scheme 910 may be part of any servo scheme. As such, the servo scheme 910 may include, but is not limited to, a wedge servo scheme, an embedded servo scheme, or a dedicated servo scheme. In some embodiments, for example, the servo patterns may be part of an embedded servo scheme such as the embedded servo scheme 910 of FIG. 9A. Because the template 900 of FIG. 9A is a schematic without certain features such as features corresponding to zones for zoned bit recording in a patterned recording medium, it should also be understood that the servo scheme 910 is not limited to the layout of FIG. 9A. The servo scheme 910 of FIG. 9A, or any other servo scheme for a patterned recording medium, including, but not limited to the foregoing, may have a layout in accordance with zone bit recording.

The template 900 of FIG. 9A may include servo regions or servo sectors 920 alternately arranged with data regions or data sectors 930 patterned therein corresponding to a patterned recording medium. The servo sectors 920 may include any servo sector fields necessary to support servo functions of a recording device in which a patterned recording medium corresponding to the template 900 is used. As such, the servo sector fields may include, but are not limited to, one or more servo sector fields selected from a sync field including a PLL field or an iPLL field, an AGC field, and/or a preamble field; a SAM field or SIM field; a Gray-coded track identification field; and a PES burst pattern field. In some embodiments, for example, the servo sectors 920 may include the PES burst pattern field of FIG. 9A, which PES burst pattern field is provided as the PES burst pattern field 922 of FIG. 9B. In some embodiments, for example, the servo sectors 920 may include the SAM field of FIG. 9A, which SAM field is provided as the SAM field 924 of FIG. 9B.

It should be understood that the servo sector fields including related fields necessary to support servo functions of a recording device in which a corresponding patterned recording medium is used need not be limited to the servo sectors 920. In some embodiments, for example, the data sectors 930 may include the PLL or iPLL fields of FIG. 9A, one of which PLL or iPLL fields is provided as the iPLL field 934 of FIG. 9B.

FIG. 9B provides a non-limiting example of a pattern 902 (or portion thereof) of the template 900 of FIG. 9A corresponding to a pattern (or portion thereof) of a patterned recording medium including servo sectors 920 patterned therein. While the servo sectors 920 may include any recording device-necessitated servo sector fields, a PES burst pattern field 922 and a SAM field 924 are illustrated in FIG. 9B as an example. The PES burst pattern field 922 may include any of a number of patterned features, including, but not limited to, patterned chevrons (e.g., pre-patterned chevrons patterned with a number of radial lines therein or thereon), two of which are illustrated in FIG. 9B. The patterned chevrons may include any of a number of different protrusions, including, but not limited to, the triangular protrusions and the rhomboidal protrusions illustrated in a cross-track 942 of FIG. 9B. The SAM field 924 may include any of a number of patterned features, including, but not limited to, patterned radial lines (e.g., pre-patterned radial lines patterned with a number of radial lines therein or thereon) and/or patterned circumferential lines (e.g., pre-patterned circumferential lines patterned with a number of circumferential lines therein or thereon), which are illustrated in FIG. 9B. The patterned radial lines and/or patterned circumferential lines may include any of a number of different protrusions, including, but not limited to, rectangular protrusions, which include square protrusions, such as the rectangular protrusions illustrated in a cross-track 944 of FIG. 9B.

The protrusions of a servo sector and/or the one or more servo sector fields thereof may be radially aligned in accordance with one or more methods of fabrication provided herein. For example, the cross-track 942 of FIG. 9B includes triangular protrusions and rhomboidal protrusions in the PES burst pattern field 922, and the cross-track 944 of FIG. 6B includes rectangular protrusions in the SAM field 924, which protrusions may be radially aligned along their respective cross-tracks.

The protrusions of a servo sector may be dimensioned in accordance with the protrusions of a servo sector provided in reference to FIG. 1B.

FIG. 9B provides a non-limiting example of a pattern 902 (or portion thereof) of the template 900 of FIG. 9A corresponding to a pattern (or portion thereof) of a patterned recording medium including data sectors 930 patterned therein. While the data sectors 930 may include any recording device-necessitated data fields and optional intervening servo sector fields, a data field 932 and an iPLL field 934 are illustrated in FIG. 9B as an example. Each of the data field 932 and the iPLL field 934 may individually include any of a number of patterned features, including, but not limited to, patterned radial lines (e.g., pre-patterned radial lines patterned with a number of radial lines therein or thereon) and/or patterned circumferential lines (e.g., pre-patterned circumferential lines patterned with a number of circumferential lines therein or thereon). As such, each of the data field 932 and the iPLL field 934 may individually include any arrangement of protrusions, including, but not limited to, a rectangular array (or pseudo-rectangular array) of protrusions consistent with magnetic features of a rectangular BPM as illustrated in FIG. 9B. The rectangular array of protrusions may include any of a number of different protrusions, including, but not limited to, rectangular protrusions, which include square protrusions. For example, a cross-track 946 in the data field 932 of FIG. 9B includes a number of such rectangular protrusions, one for each patterned circumferential line in the rectangular array of protrusions. For example, a cross-track 948 in the iPLL field 934 of FIG. 9B includes a number of such rectangular protrusions, one for each patterned circumferential line in the rectangular array of protrusions.

The protrusions of a data sector may be radially (and circumferentially) aligned in accordance with one or more methods of fabrication provided herein. For example, the cross-track 946 of FIG. 9B includes rectangular protrusions, all of which protrusions are radially aligned along the cross-track 946. For example, the cross-track 948 of FIG. 9B includes rectangular protrusions, all of which protrusions are radially aligned along the cross-track 948.

The protrusions of a data sector may be dimensioned in accordance with the protrusions of a data sector provided in reference to FIG. 1B.

A data sector may be regular with respect to the pattern of protrusions. For example, the rectangular array of protrusions in the data field 932 of FIG. 9B has regularly repeating rectangular protrusions in each of the cross-track and down-track directions. Comparatively, a servo sector may be irregular with respect to the pattern of protrusions, which may include, but is not limited to, different protrusions within a servo sector field, different protrusions in a cross-track direction, and/or different protrusions in a down-track direction. With respect to different protrusions within a servo sector field, for example, the protrusions in the PES burst pattern field 922 of FIG. 9B include triangular protrusions and rhomboidal protrusions. With respect to different protrusions in a down-track direction, for example, the protrusions in an arbitrary track of FIG. 9B may include triangular protrusions and/or rhomboidal protrusions of the PES burst pattern field 922 and rectangular protrusions of the SAM field 924.

A data sector may be dense with respect to the number of protrusions per unit area and/or the total surface area of protrusions per unit area. Comparatively, a servo sector may be sparse with respect to the number of protrusions per unit area and/or the total surface area of protrusions per unit area.

For example, the number of protrusions in the data sector 930 of FIG. 9B is greater than the number of protrusions in the servo sector 920 for about the same unit area.

In accordance with one or more methods of fabrication provided herein, a data sector and/or the protrusions therein may be radially (and circumferentially) aligned within the data sector, and a servo sector and/or the protrusions therein may be radially aligned within the servo sector. For example, the cross-track 942 of FIG. 9B includes triangular protrusions and rhomboidal protrusions in the PES burst pattern field 922, which may be radially aligned along the cross-track 942. For example, the cross-track 944 of FIG. 9B includes rectangular protrusions in the SAM field 924, which may be radially aligned along the cross-track 944 (and circumferentially aligned along an arbitrary track). For example, the cross-track 946 of FIG. 9B includes rectangular protrusions in the data field 932, which may be radially aligned along the cross-track 946 (and circumferentially aligned along an arbitrary track). For example, the cross-track 948 of FIG. 9B includes rectangular protrusions in the iPLL field 934, which may be radially aligned along the cross-track 948 (and circumferentially aligned along an arbitrary track).

FIG. 10A provides a non-limiting example of template fabrication for a patterned recording medium including servo patterns patterned therein. In a first step, a first pattern 452 may be created on a substrate 200 in a to-be-patterned area 202 to provide a sub-template 450 including the first pattern 452. In a second step, a second pattern 1062 (see FIG. 10B) may be superimposed on the sub-template 450 to provide, subsequent to etching, the template 900 including a superimposed pattern 902, wherein the superimposed pattern 902 is characteristic of the superimposition of the second pattern 1062 on the first pattern 452. As provided herein, superimposition of the second pattern 1062 on the first pattern 452 creates, subsequent to etching, radially aligned protrusions of optionally different dimensions across the template 900.

FIG. 10B provides a non-limiting example of template fabrication for a patterned recording medium including servo patterns patterned therein. In a first step, a first pattern 1062 may be created on a substrate 200 in a to-be-patterned area 202 to provide a sub-template 1060 including the first pattern 1062. In a second step, a second pattern 452 (see FIG. 10A) may be superimposed on the sub-template 1060 to provide, subsequent to etching, the template 900 including a superimposed pattern 902, wherein the superimposed pattern 902 is characteristic of the superimposition of the second pattern 452 on the first pattern 1062. As provided herein, superimposition of the second pattern 452 on the first pattern 1062 creates, subsequent to etching, radially aligned protrusions of optionally different dimensions across the template 900.

FIG. 100 provides a non-limiting example of template fabrication for a patterned recording medium including servo patterns patterned therein. In a first part of a first step, a first pattern 452 may be created on a substrate 200 in a to-be-patterned area 202 to provide a sub-template 450 including the first pattern 452. In a second part of a first step, a second pattern 1062 may be created on a different substrate 200 in a to-be-patterned area 202 to provide a sub-template 1060 including the second pattern 1062. In a second step, the first pattern 452 and the second pattern 1062 may be superimposed on yet a different substrate 200 in a to-be-patterned area 202 to provide, subsequent to etching, the template 900 including a superimposed pattern 902 by cross imprinting (e.g., cross imprinting via NIL) the sub-template 450 and the sub-template 1060. As provided herein, superimposition of the first pattern 452 and the second pattern 1062 creates, subsequent to etching, radially aligned protrusions of optionally different dimensions across the template 900.

While not shown in FIGS. 10A, 10B, and 100, the template 900 may be subsequently used to fabricate patterned recording media such as BPM (e.g., rectangular BPM) by NIL. Accordingly, the radially aligned protrusions across the template 900 correspond to magnetic features across data sectors and servo sectors of subsequently fabricated patterned recording media, which provides self-registration across the data sectors and the servo sectors obviating any discovery process, unless desired.

The pattern 452 provided in reference to FIG. 10A (e.g., the first pattern 452), FIG. 10B (e.g., the second pattern 452), and FIG. 10C (e.g., the first pattern 452) may include radial lines of relatively high resolution traversing nascent data sectors and nascent servo sectors as illustrated in FIGS. 10A and 10C. However, only a portion of the pattern 452 is illustrated in FIGS. 10A and 10C. It should be understood that the pattern 452 may annularly extend around the sub-template 450 in accordance with data sectors and servo sectors of patterned recording media to which the template 900 corresponds.

The radial lines of the pattern 452 of FIGS. 10A and 10C may be of a width and pitch to provide the template 900 with protrusions dimensioned as provided herein. Indeed, different sub-templates (e.g., 450a, 450b, 450c, . . . , 450n, wherein n indicates the $n^{th}$ sub-template), each including radial lines with a different width and pitch, may be used to control the dimensions of the protrusions in the template 900, and, ultimately, the BAR of magnetic features in corresponding patterned recording media. Such control is favorable for simultaneously optimizing different designs for fabrication of read-write heads for recording devices and fabrication of templates.

Any of a number of methods may be used to fabricate the radial lines of the pattern 452 of FIGS. 10A and 10C, including, but not limited to, electron-beam lithography, interference lithography, photolithography, imprint lithography, or a combination thereof, optionally in combination with block copolymer DSA, multiple patterning (e.g., double patterning), or a combination thereof. In some embodiments, for example, the radial lines may be fabricated using electron-beam lithography to establish a chemical pre-pattern (e.g., a binary pattern of regions with different wettability) or topographical pre-pattern in combination with block copolymer DSA thereon. For example, the method (or portion thereof) provided in reference to FIGS. 5A-5C may be used to fabricate the radial lines of the pattern 452 of FIGS. 7A and 7C.

The pattern 1062 provided in reference to FIG. 10A (e.g., the second pattern 1062), FIG. 10B (e.g., the first pattern 1062), and FIG. 10C (e.g., the second pattern 1062) may include circumferential lines of relatively high resolution traversing nascent data sectors, and radial lines and chevrons of relatively high resolution traversing nascent servo sectors as illustrated in FIGS. 10B and 10C. However, only a portion of the pattern 1062 is illustrated in FIGS. 10B and 10C. It should be understood that the pattern 1062 may extend from an inner diameter of the sub-template 1060 to an outer diameter of the sub-template 1060 in accordance with data sectors and servo sectors of patterned recording media to which the template 900 corresponds.

The circumferential lines, the radial lines, and the chevrons of the pattern 1062 of FIGS. 10B and 10C may be of a width and pitch to provide the template 900 with protrusions dimensioned as provided herein. Indeed, different sub-templates (e.g., 1060*a*, 1060*b*, 1060*c*, . . . , 1060*n*, wherein n indicates the $n^{th}$ sub-template), each including circumferential lines, radial lines, and chevrons with a different width and pitch, may be used to control the dimensions of the protrusions in the template 900, and, ultimately, the BAR of magnetic features in corresponding patterned recording media. Such control is favorable for simultaneously optimizing different designs for fabrication of read-write heads for recording devices and fabrication of templates.

Any of a number of methods may be used to fabricate the circumferential lines, the radial lines, and the chevrons of the pattern 1062 of FIGS. 10B and 10C, including, but not limited to, electron-beam lithography, interference lithography, photolithography, imprint lithography, or a combination thereof, optionally in combination with block copolymer DSA, multiple patterning (e.g., double patterning), or a combination thereof. In some embodiments, for example, the circumferential lines of relatively high resolution may be fabricated using electron-beam lithography to establish a chemical pre-pattern (e.g., a binary pattern of regions with different wettability) or topographical pre-pattern in combination with block copolymer DSA thereon. In some embodiments, for example, the radial lines and chevrons of relatively high resolution may be fabricated using electron-beam lithography to establish a chemical pre-pattern (e.g., a binary pattern of regions with different wettability) or topographical pre-pattern in combination with block copolymer DSA thereon.

FIG. 11A provides a non-limiting example of a method (or portion thereof) to fabricate the circumferential lines, the radial lines, and the chevrons of the pattern 1062 of FIGS. 10B and 10C. In a first step, a first pattern 872 including a topographical pre-pattern of relatively low-resolution guiding features (e.g., circumferential lines, radial lines, chevrons) may be formed (e.g., electron-beam lithography, interference lithography, photolithography, imprint lithography, etc.) in resist on a substrate. The first pattern 872 may include nascent servo sectors 820 corresponding to servo sectors of a patterned recording medium, each of which servo sectors may include a nascent PES burst pattern field 822, a nascent SAM field 824, or a number of the foregoing fields in combination. The first pattern 872 may also include nascent data sectors 830 corresponding to data sectors of a patterned recording medium, each of which data sectors may include a nascent data field 832, a nascent iPLL field 834, or a number of the foregoing fields in combination. In a second step, the servo sectors 820 of the second pattern 1062 including nanolines or relatively high-resolution lines of a block copolymer perpendicular to the guiding features of the topographical pre-pattern may be formed by block copolymer DSA, wherein the block copolymer includes, but is not limited to, a cylinder-forming block copolymer (lying down) or a lamella-forming block copolymer (standing up). Before or after the second step, using protection-deprotection methodology, the data sectors 830 of the second pattern 1062 including nanolines or relatively high-resolution lines of a block copolymer parallel to the guiding features of the topographical pre-pattern may be formed by block copolymer DSA, wherein the block copolymer includes, but is not limited to, a cylinder-forming block copolymer (lying down) or a lamella-forming block copolymer (standing up). In a third step, the second pattern 1062 may be transferred to a substrate to form the sub-template 1060, optionally by a standard tone or reverse tone etching process.

FIG. 11B provides an image of an example of relatively high-resolution lines of a block copolymer, which lines were formed perpendicular to relatively low-resolution guiding features of a topographical pre-pattern. The example used a block copolymer with a natural period $L_0$ of 16 nm to form high-resolution lines of the block copolymer corresponding to a nascent PES burst pattern field 1022 and a nascent SAM field 1024.

FIG. 12A provides a schematic illustrating radial displacement (AR) in template fabrication according to one or more embodiments. In some embodiments, superimposing a first pattern (e.g., the pattern 252 of the sub-template 250) and a second pattern (e.g., the pattern 262 of the sub-template 260) comprises superimposing with a radial displacement no more than 100 nm, 90 nm, 80 nm, 70 nm, 60 nm, 50 nm, 40 nm, 30 nm, 20 nm, 10 nm, 5 nm, or 1 nm.

FIG. 12B provides a schematic illustrating angular displacement (AA) in template fabrication according to one or more embodiments. In some embodiments, superimposing a first pattern (e.g., the pattern 252 of the sub-template 250) and a second pattern (e.g., the pattern 262 of the sub-template 260) comprises superimposing with an angular displacement no more than 2500 nrad, 2250 nrad, 2000 nrad, 1750 nrad, 1500 nrad, 1250 nrad, 1000 nrad, 750 nrad, 500 nrad, 250 nrad, 100 nrad, 50 nrad, or 25 nrad.

The larger the radial displacement and/or angular displacement, the more likely a discovery process for registration of tracks across the data sectors and the servo sectors in corresponding patterned recording media. However, as provided herein, the circumferentially aligned protrusions across the template correspond to magnetic features across data sectors and servo sectors of subsequently fabricated patterned recording media, which provides self-registration of tracks across the data sectors and the servo sectors obviating any discovery process.

In view of the foregoing, provided herein are non-limiting examples of templates and template fabrication for patterned recording media including servo patterns patterned therein that do not compromise the quality of the data sectors and corresponding magnetic features of patterned recording media.

As such, provided herein is an apparatus, comprising a first region corresponding to a data region in a patterned recording medium; a first set of features in the first region; a second region corresponding to a servo region in a patterned recording medium; and a second set of features in the second region comprising protrusions, wherein the first set of features and the second set of features are circumferentially aligned, characteristic of concentrically circular lines etched into the apparatus across the first region and the second region. In some embodiments, the features of the first set of features are arranged in a pseudo-rectangular array. In some embodiments, the features of the first set of features are characteristic of the concentrically circular lines intersecting with radial lines etched into the apparatus across the first region. In some embodiments, the features of the first set of features comprise rectangular protrusions. In some embodiments, the features of the second set of features are characteristic of the concentrically circular lines intersecting with a combination of radial lines and chevrons etched into the apparatus across the second region. In some embodiments, the features of the second set of features comprise a combination of rectangular protrusions and rhomboidal protrusions. In some embodiments, the apparatus comprises a nanoimprint template for a patterned recording medium.

Also provided herein is a method, comprising creating a first region comprising a first set of features in a substrate corresponding to a data region in a patterned recording medium; and creating a second region comprising a second set of features in the substrate corresponding to a servo region in a patterned recording medium, wherein creating the first region and the second region comprises superimposing a first pattern comprising concentrically circular lines and a second pattern comprising a combination of radial lines and chevrons in the substrate, and wherein the first set of features and the second set of features are circumferentially aligned, characteristic of the concentrically circular lines. In some embodiments, superimposing the first pattern and the second pattern comprises superimposing with a radial displacement less than 100 nm. In some embodiments, superimposing the first pattern and the second pattern comprises superimposing with an angular displacement less than 2500 nrad. In some embodiments, the radial lines of the second pattern comprise a first set of radial lines corresponding to the first region and a second set of wider radial lines corresponding to the second region. In some embodiments, the chevrons of the second pattern correspond to the second region. In some embodiments, the first region comprises a plurality of rectangular protrusions arranged in a pseudo-rectangular array. In some embodiments, the second region comprises a plurality of rectangular protrusions and rhomboidal protrusions.

Also provided herein is a method, comprising creating a first region comprising a first set of features in a substrate corresponding to a data region in a patterned recording medium; and creating a second region comprising a second set of features in the substrate corresponding to a servo region in a patterned recording medium, wherein creating the first region and the second region comprises superimposing a first pattern comprising concentrically circular lines and a second pattern comprising chevrons in the substrate, and wherein the first set of features and the second set of features are circumferentially aligned, characteristic of the concentrically circular lines. In some embodiments, superimposing the first pattern and the second pattern comprises superimposing with a radial displacement than 10 nm. In some embodiments, superimposing the first pattern and the second pattern comprises superimposing with an angular displacement less than 25 nrad. In some embodiments, the second pattern further comprises a first set of radial lines corresponding to the first region and a second set of radial lines corresponding to the second region, wherein the second set of radial lines comprises a larger pitch than the first set of radial lines. In some embodiments, the method further comprises creating the first pattern by electron-beam lithography, interference lithography, photolithography, imprint lithography, or a combination thereof, optionally in combination with directed self-assembly, double patterning, or a combination thereof. In some embodiments, the method further comprises creating the second pattern by electron-beam lithography, interference lithography, photolithography, imprint lithography, or a combination thereof, optionally in combination with directed self-assembly, double patterning, or a combination thereof.

Also provided herein is an apparatus, comprising a first region of a substrate corresponding to a data region in a patterned recording medium; a first set of features etched out of the first region of the substrate, wherein the features of the first set of features are rectangle shaped; a second region of the substrate corresponding to a servo region in a patterned recording medium; and a second set of features etched out of the second region of the substrate, wherein the second set of features is characteristic of radial lines etched into the substrate across chevrons etched out of the substrate. In some embodiments, the features of the second set of features are radially aligned along the radial lines etched into the substrate. In some embodiments, the features of the first set of features are radially aligned along the radial lines etched into the substrate and circumferentially aligned along circumferential lines etched into the first region of the substrate. In some embodiments, the substrate is configured to transmit ultraviolet light. In some embodiments, the apparatus comprises a UV-transmissible nanoimprint template comprising the first and second sets of features for patterned recording media.

Also provided herein is a method, comprising transferring a first pattern comprising radial lines to a first region and a second region of a substrate, wherein the first region and the second region respectively correspond to a data region and a servo region in a patterned recording medium; and transferring a second pattern comprising circumferential lines and chevrons to the first region and the second region of the substrate, respectively, wherein transferring the first pattern and the second pattern to the substrate creates radially aligned, rectangle-shaped features in the first region of the substrate and radially aligned, chevron-derived features in the second region of the substrate. In some embodiments, the method further comprises superimposing the first pattern and the second pattern in a cross-imprinting process, wherein a first sub-template comprises the first pattern, and wherein a second sub-template comprises the second pattern. In some embodiments, the first pattern and the second pattern are superimposed with a radial displacement 10 nm. In some embodiments, the first pattern and the second pattern are superimposed with an angular displacement ≤250 nrad. In some embodiments, the rectangle-shaped features and the chevron-derived features have the same circumferential pitch in accordance with the radial lines of the first pattern. In some embodiments, transferring the first pattern and the second pattern to the substrate further creates radially aligned, line-shaped features or radially aligned, square-shaped features in the second region of the substrate. In some embodiments, transferring the first pattern and the second pattern to the substrate comprises etching the first pattern and the second pattern into a UV-transmissible substrate.

Also provided herein is a method, comprising transferring a first pattern comprising radial lines to a servo region of a substrate corresponding to a servo region in a patterned recording medium; and transferring a second pattern comprising chevrons to the servo region of the substrate, wherein transferring the first pattern and the second pattern creates radially aligned, chevron-derived features in the second region of the substrate. In some embodiments, the method further comprises transferring the first pattern to a data region of the substrate corresponding to a data region in a patterned recording medium; and transferring the second pattern further comprising circumferential lines to the data region of the substrate, wherein transferring the first pattern and the second pattern creates radially aligned, rectangle-shaped features in the first region of the substrate. In some embodiments, the method further comprises superimposing a first sub-template comprising the first pattern and a second sub-template comprising the second pattern in a cross-imprinting process. In some embodiments, superimposing the first sub-template and the second sub-template comprises superimposing with a radial displacement 100 nm and an angular displacement 2500 nrad. In some embodiments, the method further comprises forming a topographical pre-pattern to the second pattern in a precursor to the second sub-template; and performing directed self-assembly of a block copolymer to form a nanoline-based pattern of block copolymer nanolines parallel or perpendicular to guiding features of the topographical pre-pattern to the second pattern. In some embodiments, the nanolines are perpendicular to the guiding features of the topographical pre-pattern. In some embodiments, the method further comprises forming a topographical pre-pattern to the first pattern in a precursor to the first sub-template; and performing directed self-assembly of a block copolymer to form a nanoline-based pattern of block copolymer nanolines parallel to guiding features of the topographical pre-pattern to the first pattern. In some embodiments, the method further comprises transferring each of the nanoline-based patterns to their respective sub-templates for the cross-imprinting process.

While some particular embodiments have been provided herein, and while the particular embodiments have been provided in some detail, it is not the intention of the applicant(s) for the particular embodiments to limit the scope of the concepts provided herein. Additional adaptations and/or modifications may readily appear to persons having ordinary skill in the art, and, in broader aspects, these adaptations and/or modifications may be encompassed as well. Accordingly, departures may be made from the particular embodiments provided herein without departing from the scope of the concepts provided herein.

What is claimed is:

1. A method, comprising:
creating a first pattern in a data region of a substrate;
creating a second pattern in a servo region of a substrate;
creating a circumferential line pattern overlapping the first pattern to create rectangle-shaped protrusions in the data region of the substrate; and
creating a chevron pattern overlapping the second pattern to create chevron-derived protrusions in a first field of the servo region and rectangular protrusions in a second field of the servo region of the substrate.

2. The method of claim 1, further comprising:
superimposing the second pattern and the chevron pattern in a cross-imprinting process,
wherein a first sub-template comprises the second pattern, and
wherein a second sub-template comprises the chevron pattern.

3. The method of claim 1,
wherein the rectangle-shaped protrusions and the chevron-derived protrusions have the same circumferential pitch in accordance with radial lines of the first pattern.

4. The method of claim 1,
wherein transferring the second pattern and the chevron pattern to the substrate further creates radially aligned, line-shaped protrusions or radially aligned, square-shaped protrusions in the servo region of the substrate.

5. The method of claim 1,
wherein transferring the first pattern and the second pattern to the substrate comprises etching the first pattern and the second pattern into a UV-transmissible substrate.

6. The method of claim 2,
wherein the second pattern and the chevron pattern are superimposed with a radial displacement ≤10 nm.

7. The method of claim 2,
wherein the second pattern and the chevron pattern are superimposed with an angular displacement ≤250 nrad.

8. A method, comprising:
forming a line pattern in a first field and a second field of a servo region of a recording medium; and
forming a chevron pattern in the second field of the servo region of the recording medium; wherein
the line pattern and the chevron pattern overlap to form a first pattern in the second field of the servo region adjacent to the line pattern in the first field of the servo region.

9. The method of claim 8, further comprising:
forming another line pattern in a data region of the recording medium; and
forming a circumferential line pattern to the data region of the recording medium,
wherein forming the another line pattern and the circumferential line pattern creates radially aligned, rectangle-shaped protrusions in the data region of the recording medium.

10. The method of claim 8, further comprising:
superimposing a first sub-template comprising the line pattern and a second sub-template comprising the chevron pattern in a cross-imprinting process.

11. The method of claim 10,
wherein superimposing the first sub-template and the second sub-template comprises superimposing with a radial displacement ≤100 nm and an angular displacement ≤2500 nrad.

12. The method of claim 10, further comprising:
forming a topographical pre-pattern to the chevron pattern in a precursor to the second sub-template; and
performing directed self-assembly of a block copolymer to form a nanoline-based pattern of block copolymer nanolines parallel or perpendicular to guiding features of the topographical pre-pattern to the chevron pattern.

13. The method of claim 12,
wherein the nanolines are perpendicular to the guiding features of the topographical pre-pattern.

14. The method of claim 12, further comprising:
forming a topographical pre-pattern to the line pattern in a precursor to the first sub-template; and
performing directed self-assembly of a block copolymer to form a nanoline-based pattern of block copolymer nanolines parallel to guiding features of the topographical pre-pattern to the line pattern.

15. The method of claim 14, further comprising:
transferring each of the nanoline-based patterns to their respective sub-templates for the cross-imprinting process.

16. An apparatus, comprising:
a data region on a substrate configured to magnetically store information;
a servo region on the substrate including a first field and a second field; and
protrusions in the servo region including rectangular protrusions in the first field and radial lines etched across chevrons in the second field.

17. The apparatus of claim 16,
wherein the protrusions are radially aligned along the radial lines.

18. The apparatus of claim 16,
wherein the data region includes protrusions radially aligned along radial lines etched into the substrate and circumferentially aligned along circumferential lines etched into the data region of the substrate.

19. The apparatus of claim 16,
wherein the substrate is configured to transmit ultraviolet light.

20. The apparatus of claim 16,
wherein the data region includes rectangle shaped protrusions.

\* \* \* \* \*